United States Patent
Yamane

(10) Patent No.: US 6,701,319 B1
(45) Date of Patent: Mar. 2, 2004

(54) STORING APPARATUS AND DATA STORING STRUCTURE

(75) Inventor: Yasuo Yamane, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/570,443

(22) Filed: May 12, 2000

(30) Foreign Application Priority Data

May 20, 1999 (JP) .......................................... 11/139636

(51) Int. Cl.$^7$ .............................................. G06F 17/30
(52) U.S. Cl. ...................................................... 707/100
(58) Field of Search ................................ 707/100, 102

(56) References Cited

U.S. PATENT DOCUMENTS

| | | | | |
|---|---|---|---|---|
| 5,355,492 A | * | 10/1994 | Frankel et al. | 717/151 |
| 5,367,692 A | * | 11/1994 | Edelman | 712/22 |
| 5,890,151 A | * | 3/1999 | Agrawal et al. | 707/5 |
| 5,963,936 A | * | 10/1999 | Cochrane et al. | 707/3 |
| 5,978,796 A | * | 11/1999 | Malloy et al. | 707/3 |
| 5,987,467 A | * | 11/1999 | Ross et al. | 707/100 |
| 6,003,036 A | * | 12/1999 | Martin | 707/102 |
| 6,003,123 A | * | 12/1999 | Carter et al. | 711/207 |
| 6,157,929 A | * | 12/2000 | Zamiska et al. | 707/200 |
| 6,289,352 B1 | * | 9/2001 | Proctor | 707/102 |

OTHER PUBLICATIONS

Gray et al., Data Cube: A Relational Aggregation Operator Generalizing Group–By, Cross–Tab, and Sub–Totals, Proceedings of the 12$^{th}$ Inter. Conf. on Data Engineering, IEEE, p. 152–159, Mar. 1996.*
Robert Rosenberg, Super Cube, Electronics Week, p. 15–17, Feb. 1985.*

* cited by examiner

*Primary Examiner*—Greta Robinson
(74) *Attorney, Agent, or Firm*—Staas & Halsey LLP

(57) ABSTRACT

A hypercube constructing unit realizes an offset space of a secondary storage as a data storing structure of a super cube, also referred to as a hypercube. An access processing unit accesses to a requested area in the offset space at a high speed by using the data storing structure of the hypercube. The hypercube constructing unit defines a hypercube by the dimension, nodes apexes), and sides, allocates each of the head (top) to last pages divisionally constructing the offset space to the nodes of the hypercube, and sets a side for linking the pages from the node of the top page to the nodes of the subsequent pages.

22 Claims, 22 Drawing Sheets

F I G. 8
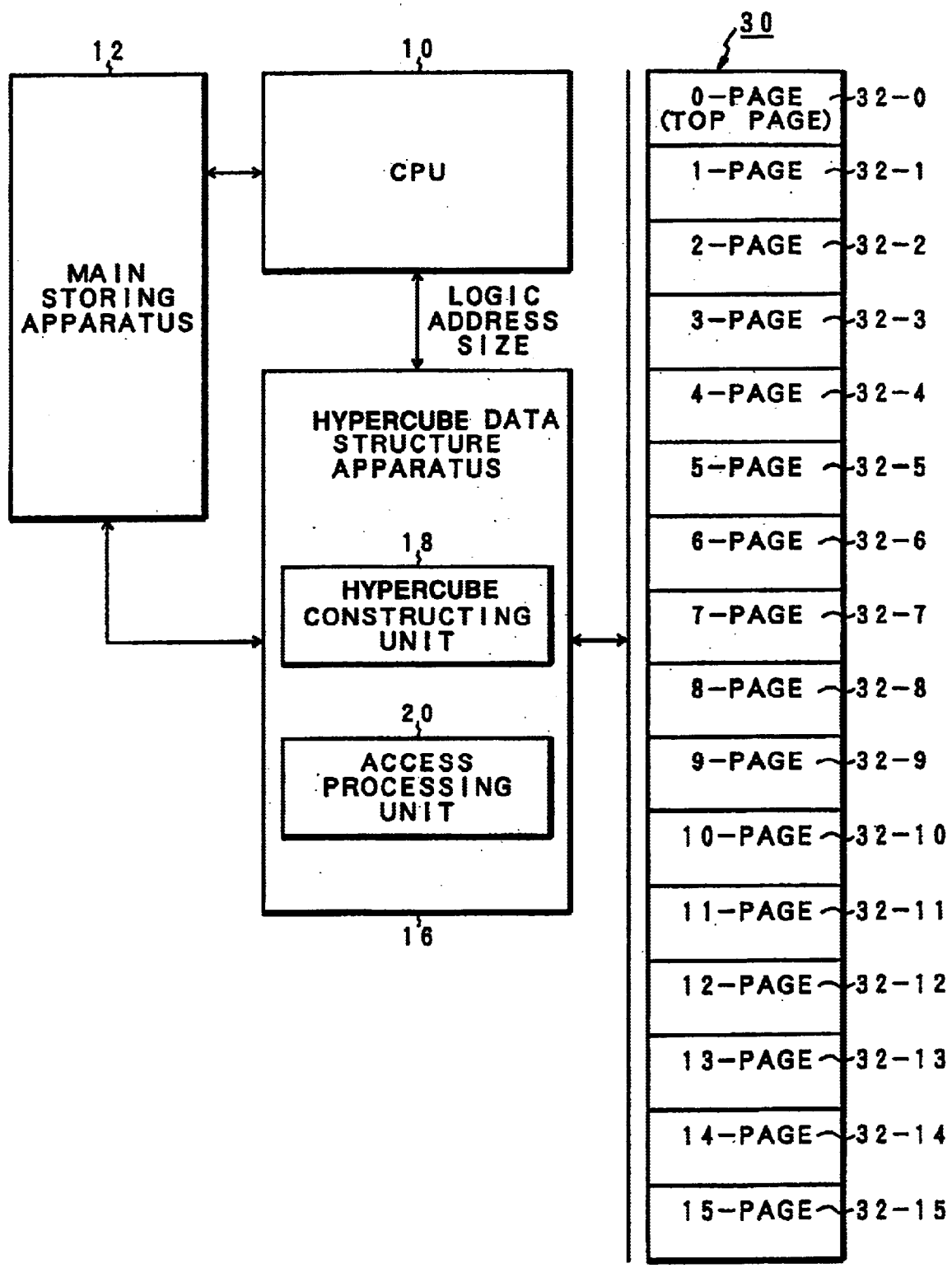

FIG. 12 next [i]

| | | |
|---|---|---|
| pageId | : PAGE ID | 46 |
| maxAreaSize | : OBTAINABLE MAX AREA SIZE IN SUBORDINATE PAGES | 48 |
| lastOffset | : LAST OFFSET OF PARTIAL HYPERCUBIC IN WHICH THE PAGE IS USED AS A ROUTE | 50 |

44-1

FIG. 13A
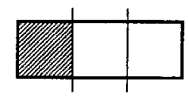
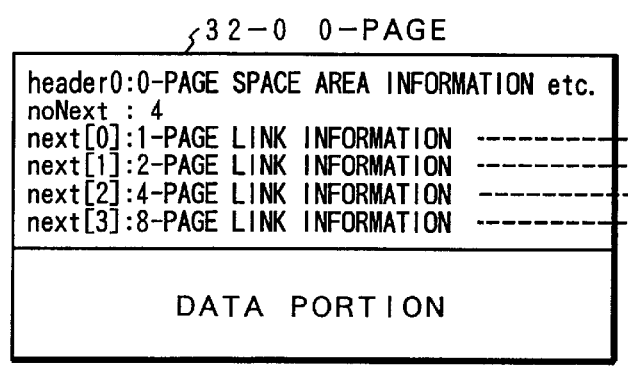
32-0 0-PAGE
header0:0-PAGE SPACE AREA INFORMATION etc.
noNext : 4
next[0]:1-PAGE LINK INFORMATION
next[1]:2-PAGE LINK INFORMATION
next[2]:4-PAGE LINK INFORMATION
next[3]:8-PAGE LINK INFORMATION
DATA PORTION FIG. 13C
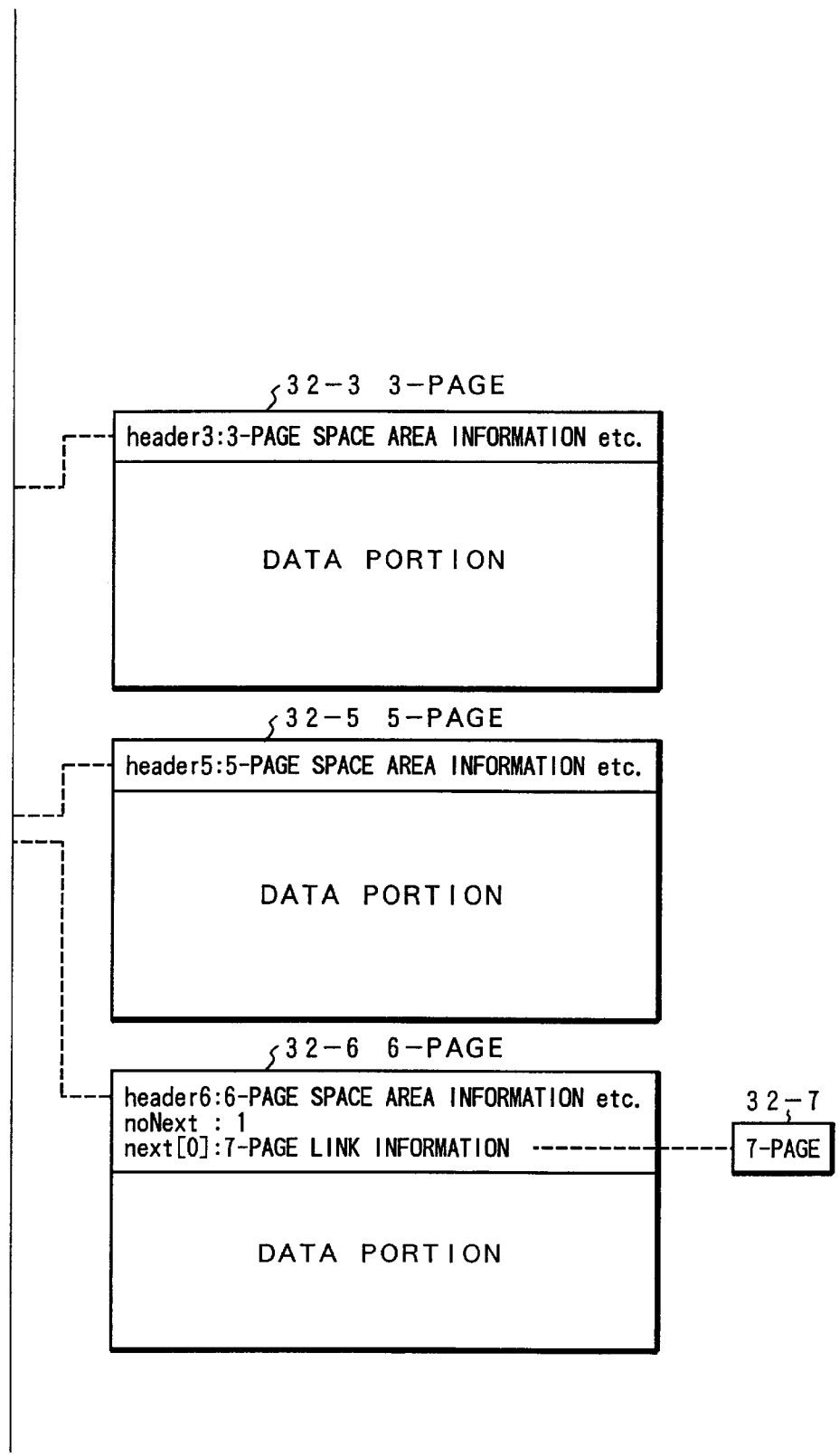

FIG. 19

| DIMENSION d | LENGTH OF SIZE e | SIZE OF OFFSET SPACE (BYTES) S(d,e) |
|---|---|---|
| 1 | 334 | 1.33MB |
| 2 | 167 | 111MB |
| 3 | 112 | 5.57GB |
| 4 | 84 | 197GB |
| 5 | 67 | 5.32TB |
| 6 | 56 | 121TB |

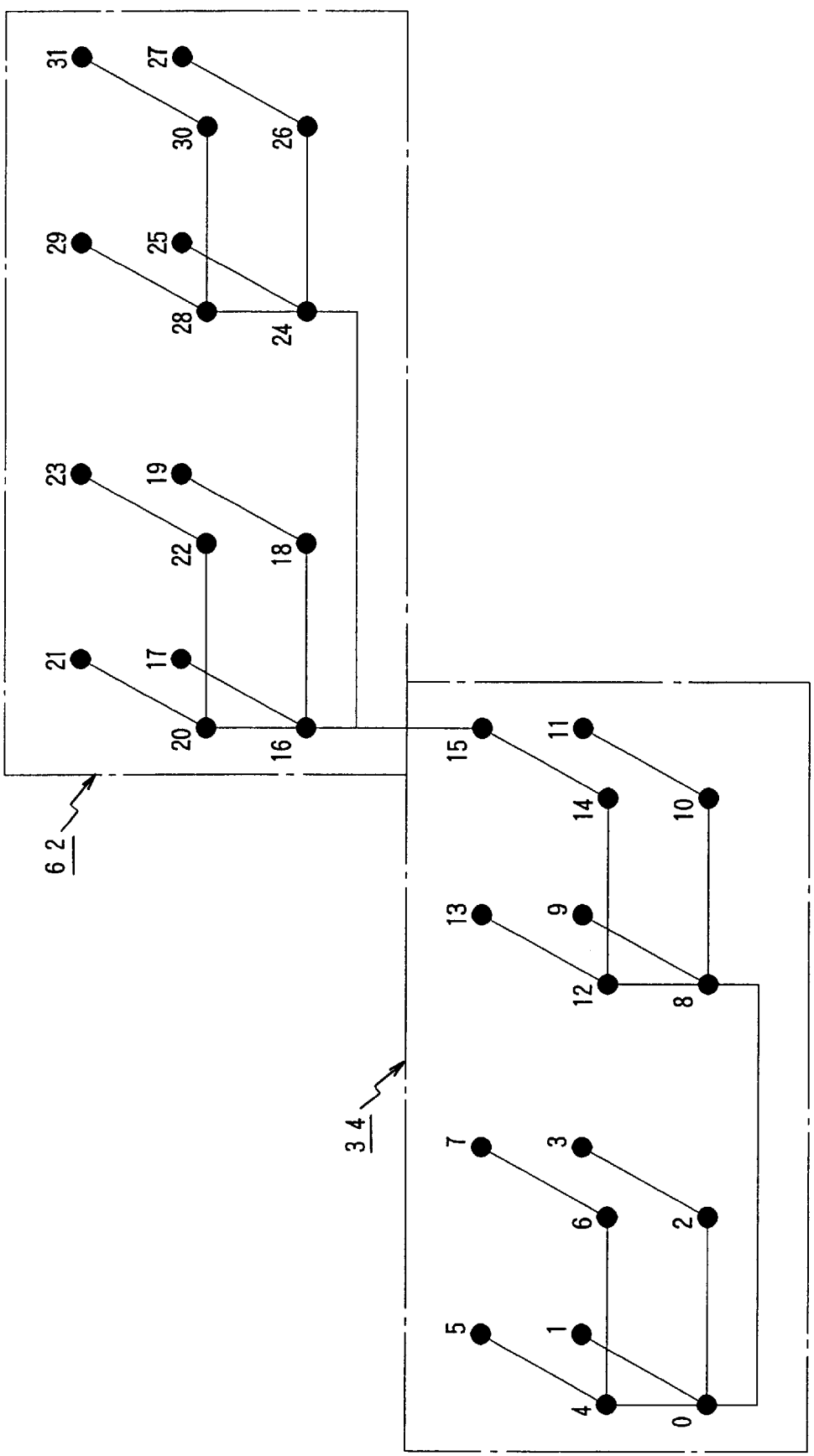

STORING APPARATUS AND DATA STORING STRUCTURE

BACKGROUND OF THE INVENTION

1. Field of the Invention

The invention relates to a storing apparatus and a storing structure for constructing an address space on a secondary storage by a hard disk drive or the like and, more particularly, to a storing apparatus and a data storing structure for realizing an offset space on a secondary storage by a data storing structure of a hypercube.

2. Description of the Related Art

Hitherto, as address spaces of a computer, in addition to an address space which is realized on a main storage, an address space which is realized on a secondary storage using an external storing apparatus such as a disk drive or the like is used. In the following description, the address space on the secondary storage is called an offset space in order to distinguish it from the address space on the main storage. An address on the offset space is merely called an offset. As an example of the offset space, a file system of UNIX as a typical operating system (OS) can be mentioned. It is assumed that the offsets are sequentially allocated to 1, 2, 3, . . . from 0 on a byte unit basis in a manner similar to the general address space or UNIX file. It is required that data of a CAD, complicated data such as a molecule structure or the like, or long data such as a multimedia like an image, a document, or the like is stored in a recent database. On the other hand, it is obviously requested that relatively simple data such as conventional numerical values, character data, records, or the like and a small amount of data can be handled. Those requests can be unitedly handled by the offset space. Therefore, it is desirable to realize an offset space at a high access efficiency. The reasons why the offset space meets the requirement such that a small amount of simple data is unitedly stored simultaneously with the complicated and long data will now be described in more detail.

(Storage of Complicated Data)

In a recent database, it is required that CAD data or complicated data such as a molecule structure or the like can be also handled. The complicated data can generally have a tree—or network-shaped structure. To realize those data by a secondary storage, like a data structure on the main storage, it is desirable that addresses are distributively allocated to areas and the data structures can be linked by the addresses. In this instance, it is desirable that the addresses are as simple as possible from viewpoints of easiness of programming and a space efficiency. The offset space meets such a requirement.

(Storage of Long Data)

In a recent database, it is required to store long data of an image, a document, or the like. Those data are often stored as files. The offset space conceptually includes a file as mentioned above and can store long data. Specifically speaking, when there is long data of (n) bytes, by storing the long data into offsets 0 to n−1 of the offset space, the long data can be stored. The offset space meets the above requirement.

(Storage of Simple Data)

Since complicated data can be stored in the offset space, conventional character train, numerical values, and records can be also obviously stored therein. In case of simple data, however, an amount of data is also generally small. In the case where data can be fully inserted in one page, in the database, it is obviously stored into one page. In such a case, therefore, it is desirable that the offset space can be also realized on a page unit basis. Hitherto, a database has a problem about how to solve an overflow. The offset space can also provide a possible solution for such a problem.

(Page is Made Unconscious)

A database is divided into areas called pages of a fixed length of, for example, 4 kB and stores data therein. "Page" is a unit of an input/output between the secondary storage and the main storage. A unit of an input/output in the OS is also generally such a page. As shown in FIG. 1, a page 100 is usually divided into a header portion 102 and a data portion 104. In case of storing user data, information on the system side is necessary independent on the data. For example, information such as size of user data and amount of remaining space areas is necessary. That information is called management information. User data and, in a special case, management information are stored in the data portion 104. The management information is stored in the header portion 102.

FIG. 2 shows a state of storage of data in the database. In this example, a record R1 and a record R2 have been stored in 0-page 100-0. Subsequently, when the user intends to insert a record R3, if it cannot be fully inserted into the 0-page 100-0, a new 1-page 100-1 is captured and the record R3 is stored in the 1-page 100-1. In case of constructing a system of the database, usually, programming is performed while the user is conscious of the pages. For example, it is now considered that the record R1 in FIG. 2 is updated. If a length of record R1 increases and the record R1 cannot be fully inserted in the 0-page 100-0, as one of countermeasures, there is a measure such that a 2-page 100-2 is newly assured and some portion in the record R1 after the updating or the whole record R1 is transferred as shown in FIG. 3. FIG. 3 shows a case where the record R1 becomes two partial records R11 and R12 after the updating, the record R11 has been stored in a 0-page 104-0, and the record R12 has been stored in a 2-page 104-2. A state where a bundle of data cannot be fully inserted into one page as mentioned above is called "overflow". The overflow is shown as an example in which the user is conscious of the page. In case of using the offset space, generally, data can be handled without allowing the user to be aware of the overflow and page. However, since there is a problem about continuity of areas, although it depends on a realizing method, a situation such that the data has to be copied or the like occurs. FIG. 4 shows a state where the overflowed records in FIG. 3 are stored in an offset space of offsets 0 to 7999.

Hitherto, there is a file system in the OS such as UNIX or the like as a typical example of the offset space. The file system of UNIX has the following features.

(1) Offset space

The file of UNIX is considered as an offset space. The offsets of 0, 1, 2, . . . are allocated to respective bytes of the data of the UNIX file from the head.

(2) Management page is separately managed

In UNIX, the user data and management information are managed by different pages. A page to store the management information is called a management page.

(3) Management page has a tree structure

The management page is realized as an unbalanced tree structure.

(4) There is no function for area management

A function for area management is provided in the address space on the main storage. Specifically speaking, functions of malloc ( ) and free ( ) are supported in UNIX. When the user wants to assure an area whose dimensions are "size", by calling this function as address=malloc(area);

the system side assures a continuous area existing on the main storage and returns the address as an "address". By setting free(address)

this area is released. So long as the area corresponding to "address" is not opened, this area is not again transferred by malloc ( ). However, the area managing function of the main storing space does not exist in the file as an offset space of UNIX. UNIX has a process for writing the contents of a continuous area of (n) bytes (such an area is called a "user buffer") on the main storage designated by the user from some offset into an area of (n) bytes and a process for, contrarily, reading out the contents of (n) bytes from some offset into a user buffer of (n) bytes designated by the user. In the database or the like, however, the area management is performed with regard to an area of the record or the like.

(5) Copy into buffer

Although pages on the secondary storage are copied into the buffer which is managed by the system, they are further copied therefrom to the user buffer on the main storage. This is because continuity of an area existing over the pages is not guaranteed.

However, the following problems remain in order to realize an offset space of a high access efficiency in the conventional system as mentioned above.

(Efficiency of Data Access)

As a simplest method of realizing the offset space, first, a method whereby pages constructing the offset space are linked in a line shape is possible.

FIG. 5 shows an example in which pages constructing an offset space are linked in a line shape. In the example, data of offsets 0 to 3999 is stored in the first 0-page 100-0, data of offsets 4000 to 7999 is stored in the next 1-page 100-1, and data of offsets 8000 to 11999 is stored in the last 2-page 100-2. In case of linking the pages in a line shape as mentioned above, the user has to trace the halfway pages in order to access to data behind the link, so that the number of inputting/outputting times, namely, costs for input/output increase. For example, in FIG. 20, if the user intends to access to an area of an offset 10000, he has to first access to the 0-page 100-0, subsequently access to the 1-page 100-1, and access to the 2-page 100-2. That is, it is necessary to input three times.

FIG. 6 shows an example in which pages constructing the offset space are linked like a tree. In this case, link information of all pages existing behind has been stored in the head page. By linking the pages like a tree as mentioned above, in case of accessing to the area of offset 10000, the user first accesses to the head 0-page 100-0 and, thereafter, he can soon access to the 2-page 100-2 by the link information L02, so that the number of inputting times can be reduced to 2. In the file system of UNIX, the offset space is realized by the unbalanced tree-like link.

(Coexistence of User Data and Management Information)

In the file system of UNIX, the management information and user data have been stored in different pages. Therefore, in case of accessing to the user data, the user first accesses to the management page and subsequently accesses to the user page. That is, it is necessary to input at least twice. If the management information and the user data were stored in the same page, such a problem can be solved. FIGS. 5 and 6 show examples in which the management information and the user data are stored in the same page and it is a system which is usually used in the database.

(Realization of Offset Space Which can be Expanded)

Although an amount of user data is initially small, the user data is often added and updated later and its amount further increases. That is, it is desirable that the offset space can be expanded. If the maximum value of the size of offset space is small, the user data cannot be added nor updated any more. It is, therefore, desirable to limit the maximum value as gentle as possible. A method of enlarging the offset space can be realized by constructing such a structure by a plurality of stages, although the tree is constructed by one stage, for example, in case of FIG. 21. The system of expanding the offset space by increasing the number of stages is also used in UNIX.

(Balance of User Data and Management Information)

In case of a relatively small amount of data, it is desirable to store the data into the head 0-page as possible from a viewpoint of an access efficiency. This is because if an amount of management information is large, the user data is pressed, the data to be inserted in the head 0-page is expelled, and the access efficiency deteriorates. On the other hand, in case of the long data, since the total number of inputting/outputting times causes a problem, contrarily, it is desirable to insert the management information as much as possible to the head 0-page or the upper page of the tree structure. That is, it is desirable that the balance of the user data and the management information can be adjusted by the data amount.

(Realization of Continuous Area and Discontinuous Areas)

In case of storing data such as long data, for example, data of 10000 bytes, in FIG. 6, it is sufficient to store the data in a range from the offset 0 of the 0-page 100-0 to the offset 9999 of the 2-page 100-2. However, contrarily, in case of accessing to the data of 10000 bytes stored in the offset space, since the data of the offsets 0 to 3999 has been stored in the same 0-page 100-0, it is continuous. However, the data of the offsets 4000 to 7999 and the data of the offsets 8000 to 9999 have been stored in the different pages of the 1-page 100-1 and the 2-page 100-2, respectively, it is impossible to continuously access them. Therefore, in the case where the data has been divided into a plurality of pages and stored in the offset space as mentioned above, by sequentially copying the data of the offsets 0 to 3999, the data of the offsets 4000 to 7999, and the data of the offsets 8000 to 9999 from the head of the user buffer in which the data of 10000 bytes can be usually inserted and which has been prepared by the user, they can be accessed as continuous information. Such a method of copying the data into the user buffer is generally used to continuously access the long data. In this case, however, costs to copy are high. For example, in case of small data of 100 bytes, the areas of 100 bytes can be assured as a continuous area on one page. In this case, there is no need to copy the data into the user buffer but it is possible to directly access as a continuous area. To realize the offset space of a high access efficiency, it is desirable that both of them can be realized. It is also desirable that the maximum value of the size of continuous area is as large as possible.

SUMMARY OF THE INVENTION

According to the invention, there are provided a storing apparatus and a storing structure for realizing an offset space of high access efficiency by satisfying various conditions which are required for the offset space.

(Hypercube Structure)

A storing apparatus of the invention comprises: a hypercube constructing unit for realizing an offset space of a secondary storage as a data storing structure of a hypercube; and an access processing unit for accessing to an area of the requested offset space at a high speed by using a data structure of a hypercube. The hypercube constructing unit defines a hypercube by a dimension (d), a node (apex), and a side, allocates each of the pages in a range from the head page (top page) to the last page which divisionally constructs the offset space to the node of the hypercube, and sets a side for linking the pages from the node of the head page toward the node of the subsequent page. On the basis of the requested offset and size (the number of bytes), the access processing unit accesses to the requested page in accordance with a route determined by the dimension (d), node, and side of the hypercube.

According to the invention, by constructing the offset space in a hypercube shape as mentioned above, an efficient data access is realized. With respect to the side, all of the ordinary sides of the hypercube are not used but only the sides of the portion constructing a tree in a state where the pages are allocated are used like a hypercube. This is because all of the sides are not always necessary for data access but so long as there is a portion of the tree including the nodes, the high efficient data access can be realized without deteriorating the access efficiency.

The nodes of the hypercube correspond to the pages of the offset space. The numbers allocated to the respective nodes of the hypercube are page numbers. The data is sequentially stored from the data of the smaller number. For example, assuming that the data portion of the 1-page consists of 4 kB (4096 bytes), the offsets 0 to 3999 are stored into the 0-page, the offsets 4000 to 7999 are stored into the 1-page, and the offsets 8000 to 11999 are stored into the 2-page. While the data is fully inserted in the 0-page, only the 0-page exists. When the data cannot be inserted in the 0-page, the hypercube constructing unit assures the 1-page, thereby expanding the offset space. In a manner similar to the above, the offset space is sequentially expanded in order of 2-page, 3-page, . . . , n-page.

A hypercube 34 has a nature such that even if the number of nodes increases, the number of sides extending from one node does not increase so much. For example, in case of a n-dimensional hypercube, the number of nodes is equal to the nth power of 2. However, the number of sides extending from one node is equal to up to (n) and the total number of sides is equal to (the nth power of 2) minus 1 (=2n−1) that is smaller than the number of nodes by 1 considering the tree structure. There is also a preferable nature such that the distance from the original node to the farthest node, namely, the number of sides which are traced is not increased so much. Therefore, the structure of the hypercube is used in a parallel computer or the like. Although it is undesirable to increase the number of communication lines extending from one node, namely, from a processor even in the parallel computer, it is requested to also shorten an average distance between the nodes in order to reduce communication costs. The hypercube has a balanced structure. According to the invention, it is intended to balance the distance and the number of sides by using such a nature of the hypercube, thereby realizing the offset space of a high access efficiency.

(Coexistence of User Data and Management Information)

The hypercube constructing unit constructs each page by a header portion and a data portion and stores link information to the subsequent page allocated to the nodes of the hypercube in the header portion. Therefore, the access processing unit sequentially accesses from the head page toward the requested page with reference to the link information of each page. As link information in the header portion, the hypercube constructing unit sets a page identifier of a link destination, the obtainable maximum area size in the subsequent page, and the last offset of the subsequent partial hypercube. Therefore, when the requested offset is included in the own page area, the access processing unit finishes the route search of the super cube and accesses the data in the relevant area. When the requested offset is not included in the own page area, the access processing unit selects and accesses the page of the subsequent route in which the requested offset is included. As mentioned above, the present invention fundamentally has a structure such that the user data and the management information are inserted in the same page. This is because it is intended to realize the coexistence of the user data and the management information in consideration of the access efficiency. Further, according to the invention, a ratio of the user data and the management information can be customized. In the extreme case, only the management information can be used with regard to the top page.

(Customization by the Dimension and the Length of Side)

In the case where the number of pages which are allocated onto the side including the nodes of the hypercube is defined as a length (e) of side, the hypercube constructing unit can set the length (e) of side to 3 or more and set the number of pages existing on one side to 3 or more. The hypercube constructing unit realizes an offset space adapted to various requests by adjusting the dimension (d) of the hypercube and the length (e) of side including the nodes. In a so-called hypercube, although two nodes exist on one side, a construction in which three or more nodes exist on one side is further possible in the invention. In the case where (e) nodes exist on the side, it is assumed that a length of this side is equal to (e). When three pages are arranged on the side, a length (e) of side is equal to 3. When two pages are arranged on the side, the length (e) of side is equal to 2. In the invention, the dimension (d) and the length (e) of side can be adjusted.

As for the pages existing on the side, it means that they can be accessed from the page of the node of the apex that is nearer to the 0-page by the input of once. For example, to access from the 0-page to the 1-page or to the 2-page, it can be accessed by inputting once in both cases. This is because the link information to the 1-page and 2-page existing on the same side is stored in the 0-page. Explanation will be made further in detail. As a case where (e=2) nodes exist on one side, it is now assumed that there is the first node at the edge of the side extending from the start node serving as node 0, there is the second node at the edge of the side extending from the first node, and further, there is the third node at the edge of the side extending from the second node. In this case, among the nodes of each side, as link information to access from the first node near the start node to another second node of this side, one link information is necessary. In the second node, the link information regarding the first node in the direction returning to the start node is unnecessary and it is sufficient that there is only link information regarding the third node of the other side.

When (e=3) nodes exist on one side, for example, when an attention is paid to a certain side on which three nodes of the first, second, and third nodes exist, (e−1), namely, two link information for directing to each of the second and third nodes is necessary in the first node at the edge near the start node of this side. On the contrary, with respect to the second and third nodes, the link information in the direction returning to the first node is unnecessary. By enabling the length (e) of side to be set to 3 or more and enabling the dimension (d) and the length (e) of side to be adjusted as mentioned above, it is possible to cope with various requests for the offset space. For example, it is possible to cope with the following different requests.

I. It has initially been known that the data amount can be inserted in the 1-page and no link is necessary and the user wants to insert user data into the top page as much as possible.

II. In future, there is a possibility that a data amount increases. Although a link for this purpose is necessary, since the data amount is initially small, the user wants to also insert data into the top page.

III. Since the data amount is large, although it is sufficient that the contents in the top page are constructed only by the link information, the user wants to raise the access efficiency as high as possible by reducing a troublesomeness for tracing the link.

(Expansion of Space)

When the offset space in which the pages have been allocated onto the hypercube which has previously been constructed is full, the hypercube constructing unit can expand the offset space by linking a new hypercube. According to the invention, the offset space can be first enlarged by increasing the pages to the hypercube designated by the dimension (d) and the length (e) of side. It is unnecessary to prepare those pages from the beginning. For example, the offset space can be expanded from the 0-page to the 15-page. However, when the page reaches the 15-page, the offset space becomes full. In the case where a data amount which is increased cannot be known unless the offset space can be expanded any more, a situation such that the dimension (d) and the length (e) of side have to be designated to those than they are needed or the like occurs, so that there is a case where it becomes inconvenient. Therefore, when the offset space constructed in the beginning becomes full, the offset space is enabled to be expanded by linking a new hypercube. However, the expansion exceeding the offset space of the initially set hypercube should not be often used because the access efficiency deteriorates. When the size of data is presumed, the dimension (d) and the length (e) of side should be exactly designated.

(Realization of continuous area and discontinuous areas)

The hypercube constructing unit can make the sizes of pages which are allocated to the hypercube different. For example, the sizes of pages which are allocated to the hypercube are set to the minimum size and a multiple of the minimum size or a multiple of the power. For example, now assuming that the minimum size is set to 4 kB, the page sizes are set to 8 kB, 16 kB, 32 kB, ... as multiples of the power of 2. Even if the sizes of pages are fixed to, for example, 4 kB, the data generally becomes discontinuous on the secondary storage. However, if the user prepares the continuous area onto the buffer, it is possible to access as a continuous area by copying from the page to the buffer. However, the costs to copy are high. Therefore, in the invention, by providing the page sizes of 8 kB, 16 kB, 32 kB, ..., the data which cannot be fully inserted in the page of 4 kB can be directly accessed without copying it as a continuous area.

The invention provides a data storing structure itself and comprises: an offset space of a secondary storage constructed by an external storing apparatus; and a hypercube constructing unit for realizing the offset space as a data storing structure of a hypercube. The details of the hypercube constructing unit are substantially the same as those in case of the storing apparatus.

The above and other objects, features, and advantages of the present invention will become more apparent from the following detailed description with reference to the drawings.

BRIEF DESCRIPTION OF THE DRAWINGS

FIG. 8 is a block diagram of a functional construction of the invention;

FIG. 12 is an explanatory diagram of link information provided in a header portion in FIG. 11;

FIGS. 13A, 13B, and 13C are explanatory diagrams of an offset space in FIG. 7 stored in accordance with a hypercube in FIG. 8;

FIG. 19 is an explanatory diagram of a correspondence relation of a size of offset space for the dimension (d) and the length (e) of side in the case where management information is stored only in a top page in the hypercube data storing structure in FIG. 16; and FIG. 20 is an explanatory diagram of an expansion structure in the case where the offset space of the hypercube in FIG. 10 becomes full.

DETAILED DESCRIPTION OF THE PREFERRED EMBODIMENT (Hypercube Data Storing Structure in Which Two Pages are Arranged on one Side)

Figure 7:
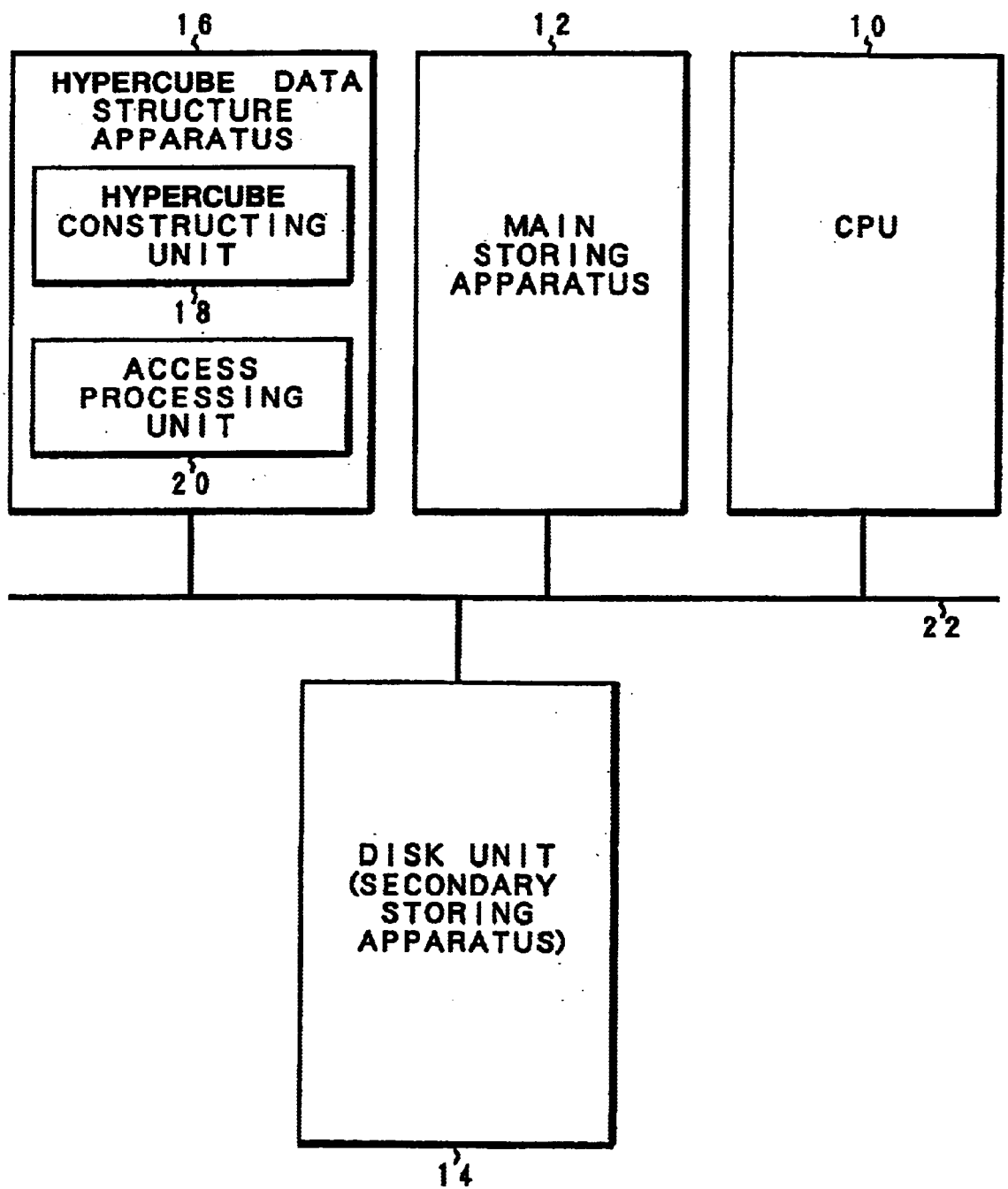
FIG. 7 is a block diagram of a hardware construction of the invention.

FIG. 7 is a block diagram of a hardware construction with respect to an example of a general computer to which a hypercube data storing structure of the invention is applied. A storing apparatus of the invention comprises: a central processing unit (CPU) 10; a main storing apparatus 12; a disk unit 14 which is used as a secondary storing apparatus; and further, a hypercube data structure apparatus 16 to realize the hypercube data storing structure of the invention. Those apparatuses are connected by a bus 22. As a disk unit 14, besides a hard disk drive, a proper secondary storing apparatus such as optical disk drive, semiconductor memory device, or the like can be used. A hypercube constructing unit 18 and an access processing unit 20 are provided for the hypercube data structure apparatus 16. The hypercube constructing unit 18 realizes an offset space of a secondary storage as a data storing structure of the hypercube. The access processing unit 20 accesses at a high speed to the area of the offset space requested from the CPU 10 by using the data structure of the hypercube.

Figure 1:
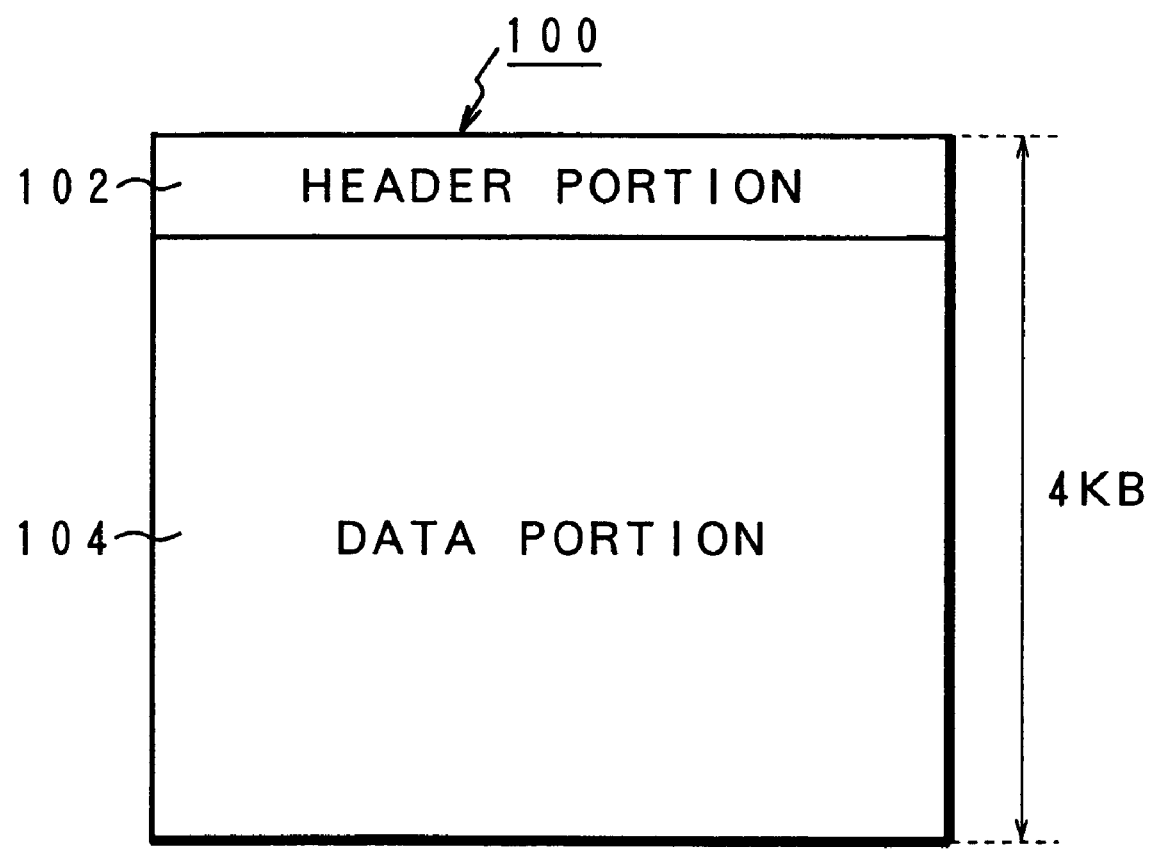
FIG. 1 is a general explanatory diagram of a page structure in an offset space.
Figure 2:
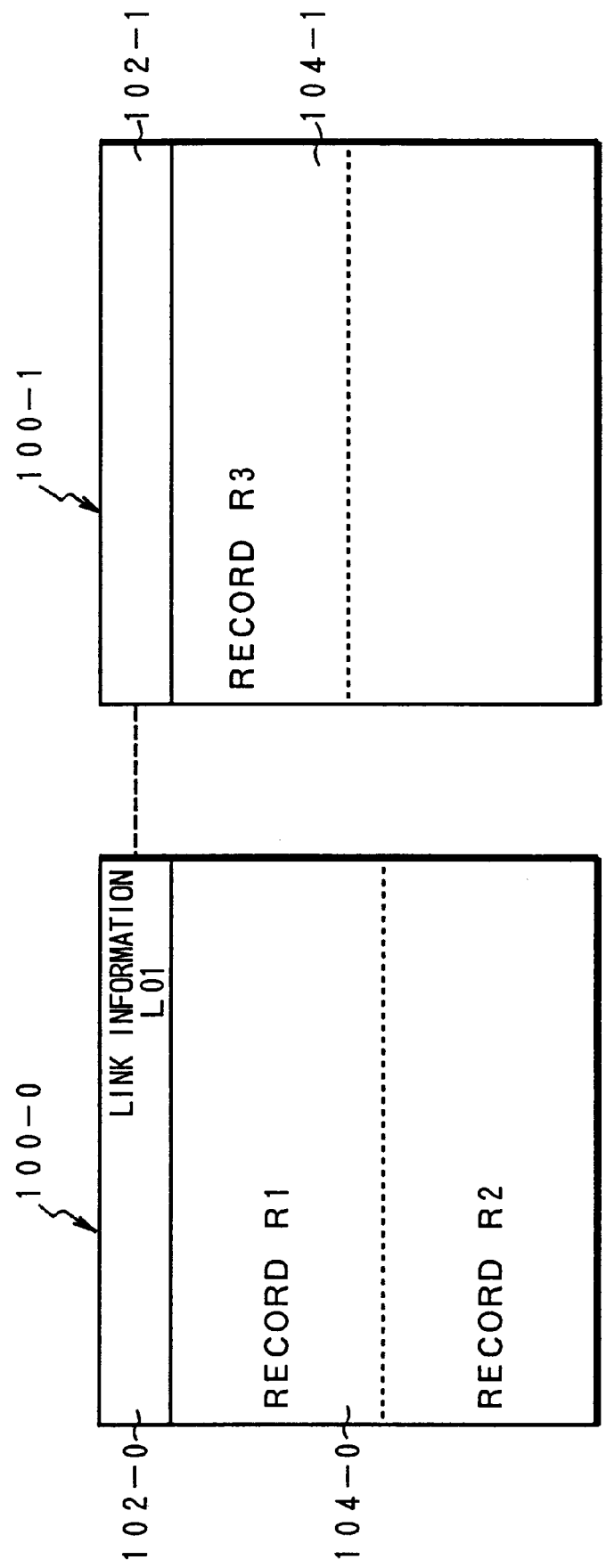
FIG. 2 is an explanatory diagram of a data storage by pages.
Figure 3:
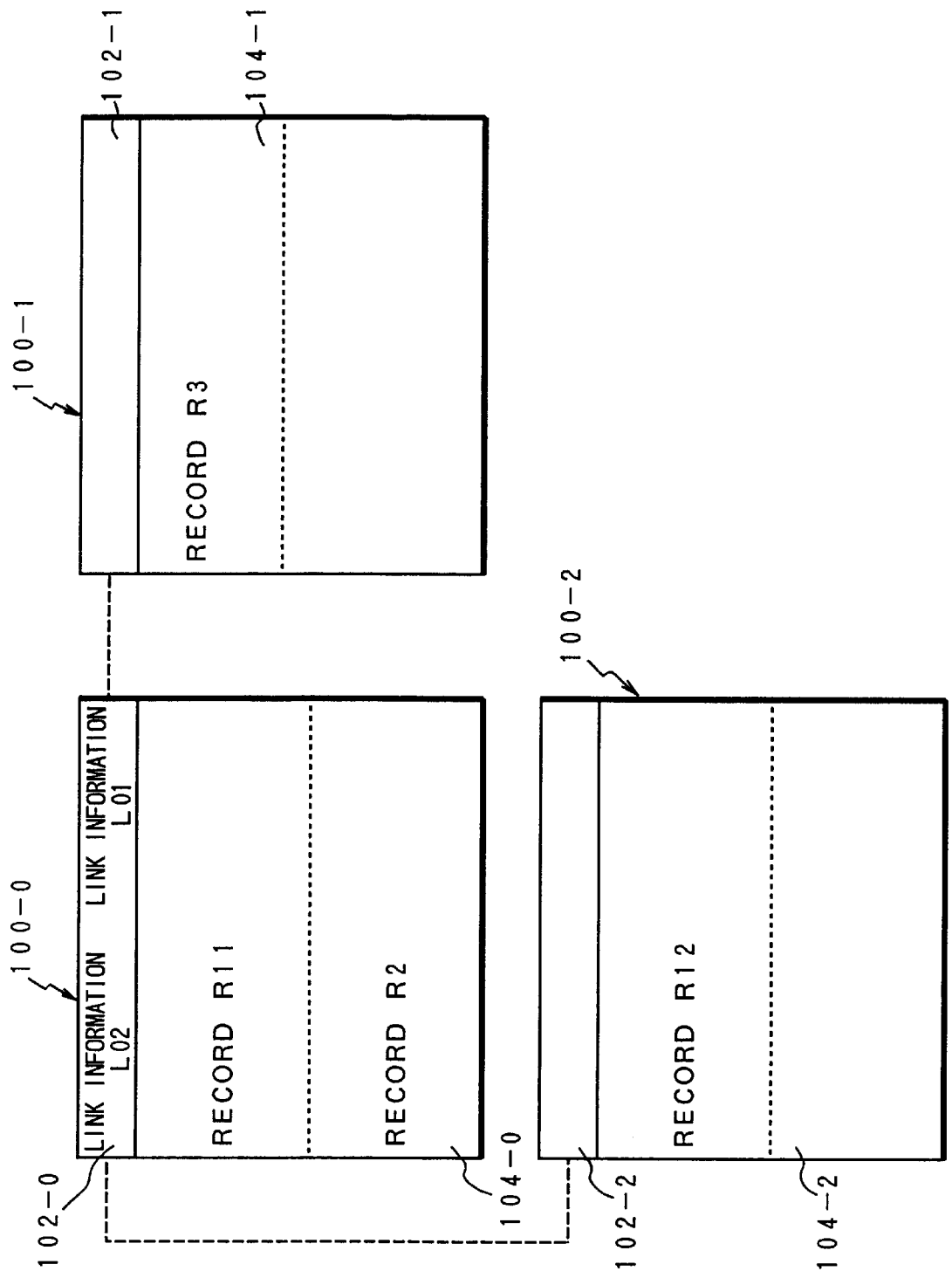
FIG. 3 is an explanatory diagram of a page expansion in the case where data stored in a page overflows.
Figure 4:
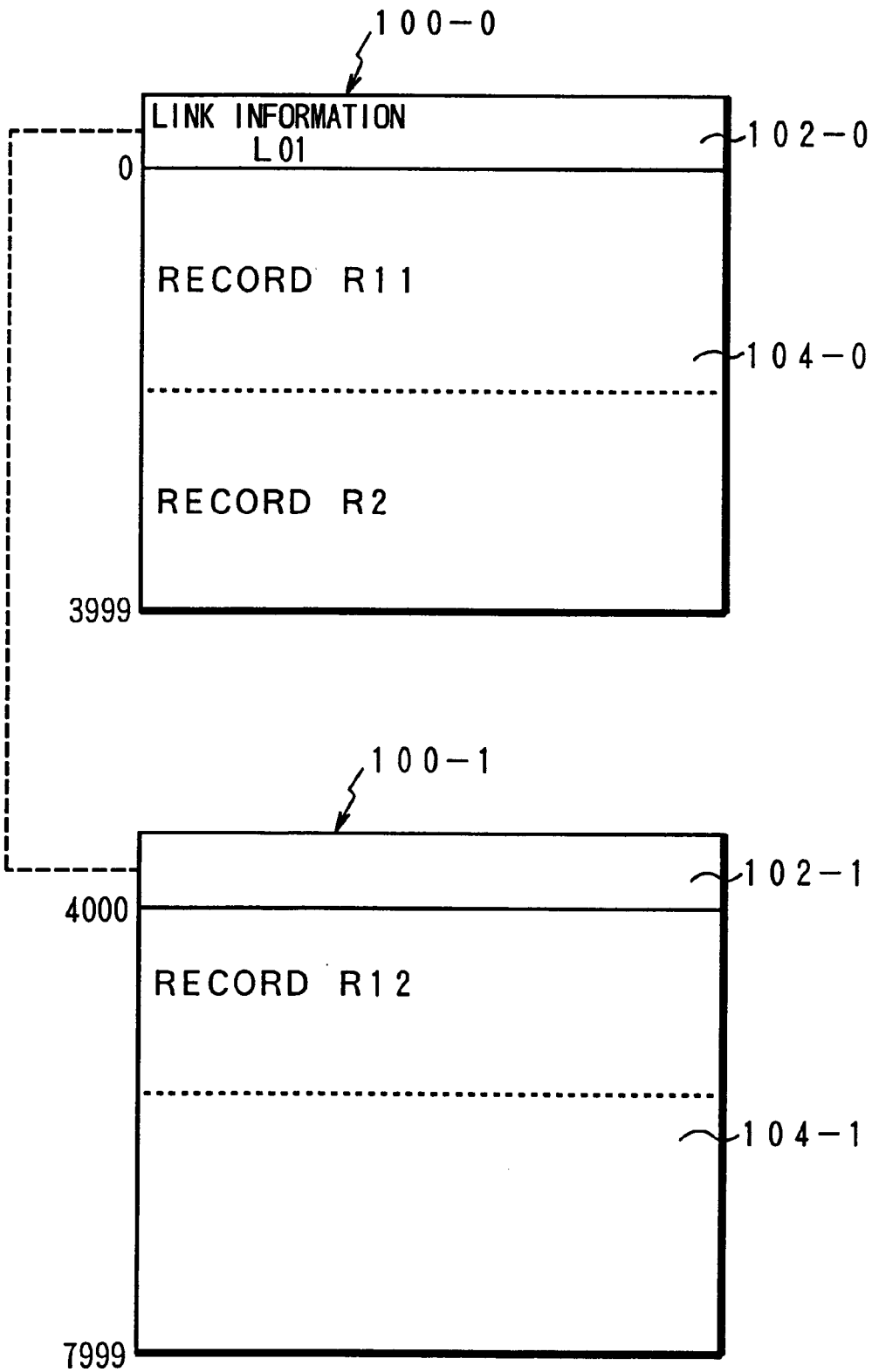
FIG. 4 is an explanatory diagram of a page storing state in an offset space.
Figure 9:
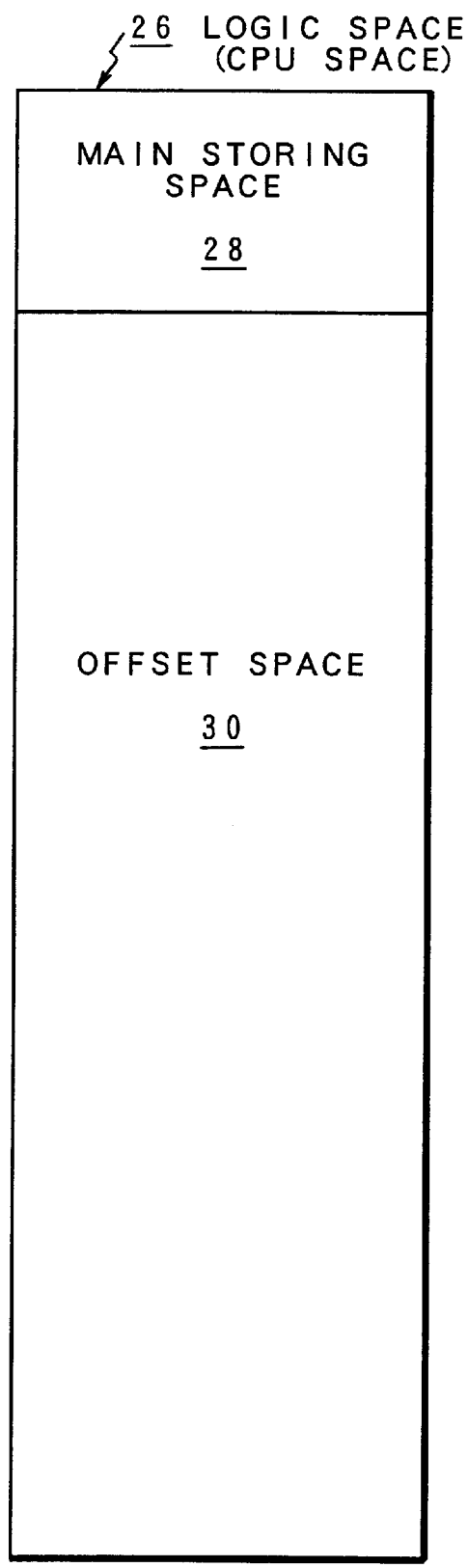
FIG. 9 is an explanatory diagram of a logic space, a main storing space, and an offset space in the invention.
Figure 10:
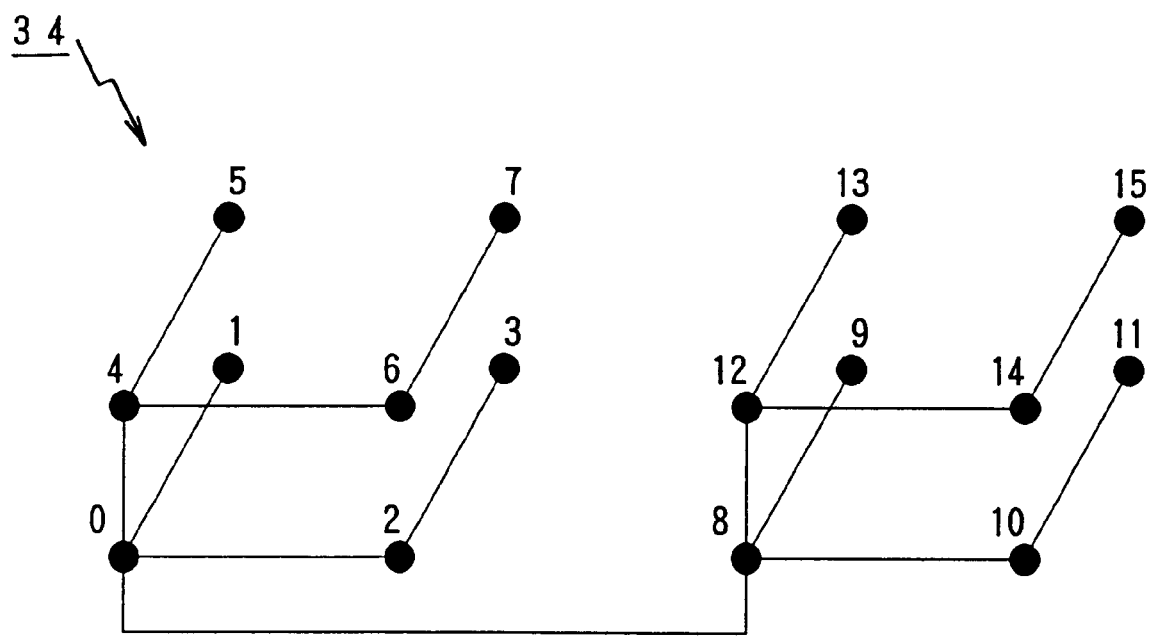
FIG. 10 is an explanatory diagram of a data storing structure of a hypercube of the invention in the case where a dimension (d) is set to 4-dimension and a length (e) of side is set to 2.
Figure 11:
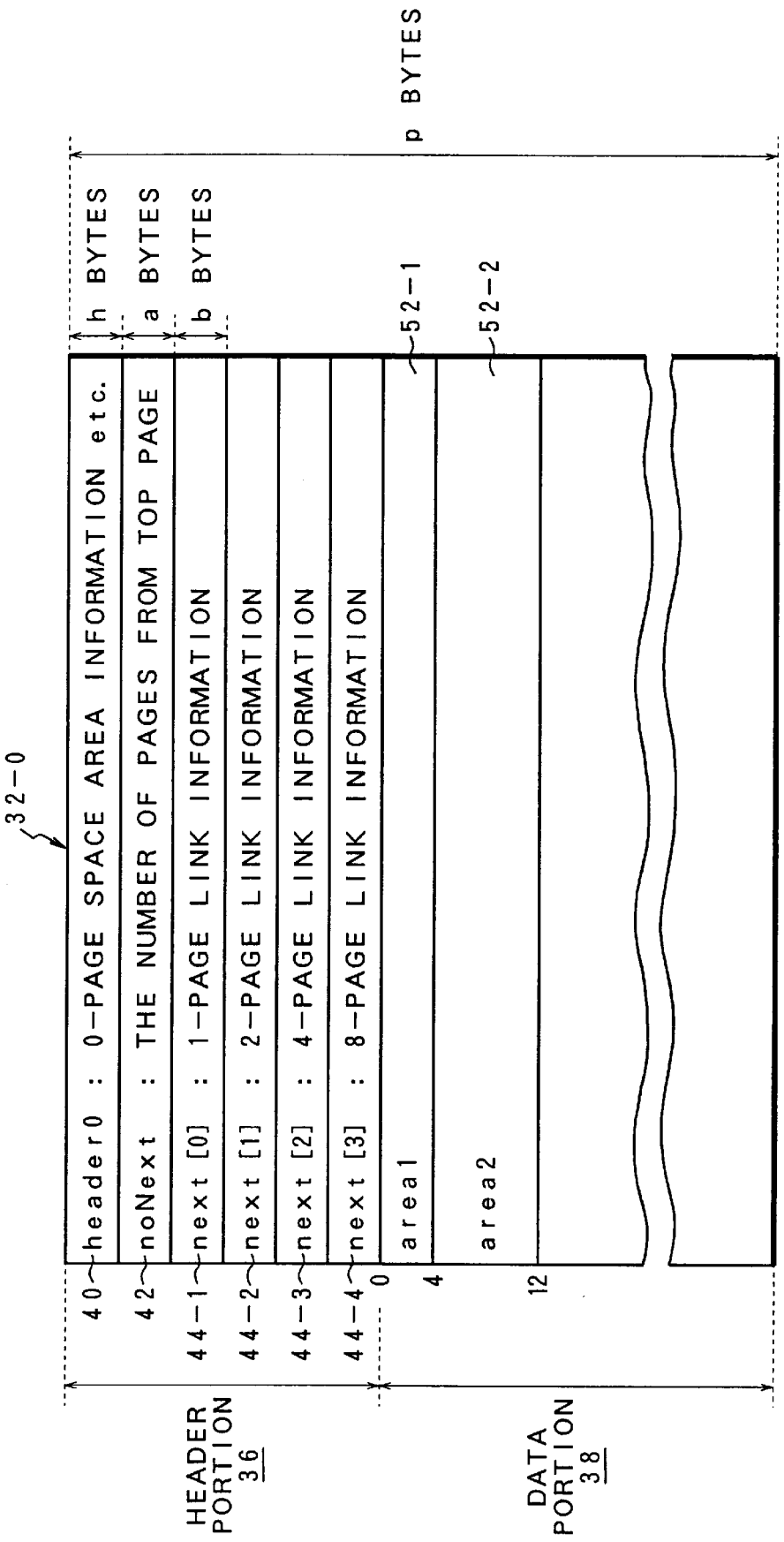
FIG. 11 is an explanatory diagram of a data structure of a 0-page in FIG. 8.

FIG. 8 is a block diagram of a functional construction of the invention in which the hardware construction of FIG. 7 is considered as a prerequisite. An offset space 30 on the secondary storage which is realized by the disk unit 14 in FIG. 7 is constructed by, for example, 16 pages of a 0-page 32-0 to a 15-page 32-15. The offset space 30 constructs a logic space of the CPU 10 together with a main storing space of the main storing apparatus 12. Specifically speaking, as shown in FIG. 9, a main storing space 28 of the main storing apparatus 12 is allocated to the upper address side of the logic space (CPU space 26) of the CPU 10, and the offset space 30 on the secondary storage is allocated subsequently to the main storing space 28. The hypercube constructing unit 18 provided for the hypercube data structure apparatus 16 realizes, for example, a data storing structure of a hypercube 34 as shown in FIG. 10. The hypercube 34 is applied to the case where the offset space 16 is constructed by the sixteen pages 32-0 to 32-15 as shown in FIG. 8. The data storing structure by the hypercube 34 is determined by the designation of the dimension (d) of the hypercube and the length (e) of side which is defined by the number of pages existing on one side. The hypercube 34 in FIG. 10 relates to the case where the dimension (d) is set to 2 dimension and the length (e) of side is equal to 2, namely, two pages are arranged on one side. The nodes serving as apexes of the hypercube correspond to the pages in the offset space 30 and node numbers 0 to 15 indicative of the pages corresponding to the 0-page 32-0 to the 15-page 32-15 in FIG. 3 are allocated to the respective nodes. FIG. 11 shows a data structure of a page in the offset space 30 in FIG. 8 which is applied to the data storing structure of the hypercube 34 in FIG. 10 and relates to an example of the top page 32-0 serving as a 0-page. A data structure of this page is constructed by a header portion 36 and a data portion 38. A header fixed area 40 shown by {header0} and a subsequent page number storing area 42 shown by "noNext" are stored in the header portion 36. Further, 1-page link information 44-1, 2-page link information 44-2, 4-page link information 44-3, and 8-page link information 44-4 shown by an array of next{0} to next{3} are stored in the header portion 36. "noNext" is an abbreviation of "no. of next". The user data is stored in the data portion 38 on an access unit basis of one time. For example, a data area 52-1 of "area1" and a data area 52-2 of "area2" are used in the data portion 38.

Each management information of the header portion 36 will now be described in detail. First, link information of each page of the header portion 36 will be described. In case of the top page 32-0 in FIG. 8, as will be obvious from the hypercube 34 in FIG. 10, there are four pages of 1-page, 2-page, 4-page, and 8-page as neighboring pages which can be traced from the top page. Therefore, the 1-page link information 44-1, 2-page link information 44-2, 4-page link information 44-3, and 8-page link information 44-4 are stored in the array next{0} to the array next{3} in the header portion 36 in FIG. 11, respectively. Each of the page link information 44-1 to 44-4 has a data structure shown as link information 44-i in FIG. 12. That is, a page ID 46 shown by "pageId", a maximum area size 48 shown by "maxAreaSize", and further, a last offset 50 shown by "lastOffset" are stored in the link information 44-i. The link information 44-i is information regarding another page which is accessed from the present page. Page identifiers of the adjacent pages in the link information are stored in the page ID 46. It is possible to access to the next adjacent page by the page ID 46. Although the link information usually indicates information such as a page identifier, in the invention, it is used as a wide meaning containing not only the page identifier but also the max area size 48, last offset 50, and the like. A size of the maximum continuous area which can be captured among the adjacent pages and the pages under domination thereof is stored as an "obtainable max area size in subordinate pages" in the next max area size 48. "Subordinate" denotes that when it is assumed that, for example, the adjacent page is the 4-page in the hypercube 34 in FIG. 10, the subordinate pages are the 5-page, 6-page, and 7-page. If the adjacent page is the 7-page, there is no subordinate page. The max area size 48 is information necessary to realize a continuous area in the page and is unnecessary in case of constructing data onto the buffer by coupling discontinuous data divided to pages like long data.

In the invention, a terminology called a partial hypercube is introduced. When the portions of the 4-page, 5-page, 6-page, and 7-page in the hypercube 34 in FIG. 10 are considered from another viewpoint, a hypercube is similarly constructed by those pages. A partial hypercube in the hypercube 34 as mentioned above is called a partial hypercube. For example, the partial hypercube comprising the 4-page, 5-page, 6-page, and 7-page is called a partial hypercube in which the 4-page is used as routes. Therefore, a partial hypercube comprising only the 7-page is also possible. Further, the whole hypercube 34 in which the 0-page is used as a route is also considered as a special partial hypercube. The dimension can be also considered with respect to such a partial hypercube. The dimension of the partial hypercube in which the 4-page is used as routes is the 2-dimension. The dimension of the partial hypercube in which the 7-page is used as a route is the 0-dimension. The dimension of the partial hypercube in which the 0-page is used as a route is the 4-dimension. The dimension of each node to which the page number is allocated in the super cube 34 in FIG. 10 is conveniently defined for use in the following explanation. That is, it is defined that the dimension of some node is equal to the dimension of the partial hypercube in which such a node is used as a route. For example, the node of the 4-page is set to the 2-dimension and the node of the 7-page is set to the 0-dimension. If the word "partial hypercube" is used, a size of the obtainable maximum continuous area in the hypercube in which the adjacent pages are used as routes is stored in the max area size 48 in FIG. 12. By checking the value of the max area size 48, whether an area can be newly obtained by accessing to the present page or not can be discriminated before accessing to the subsequent page. The last offset of the partial hypercube in which the adjacent pages are used as routes is stored in the next last offset 50. In case of accessing to the area having some offset by the value of the last offset 50, to which page an access should be performed can be known. As another setting method of the value of the last offset 50, in case of linking the discontinuous areas like long data, a method whereby the size of page is fixed to, for example, 4 kB and the value of the obtainable maximum offset in the partial hypercube in which the adjacent nodes are used as routes is set to the last offset 50 of the adjacent pages is also possible.

Referring again to FIG. 11, the number of pages which can be traced from the top page, for example, "4" in case of the hypercube 34 in FIG. 10 is stored in the subsequent page number storing area 42 shown by "noNext" in the header portion 36. The other management information is stored in the header fixed area 40 shown by top "header0" in the header portion 36. As management information, for example, management information indicating which space remains as an empty area for the continuous area in the 0-page is stored. Data areas to store the user data are sequentially allocated from the top to the data portion 38 provided subsequent to the header portion 36. In this example, the two data areas 52-1 and 52-2 shown by "area1" and "area2" are set. In this case, the offset of the data area 52-1 is equal to 0 and the length is equal to 4B. The offset of the data area 52-2 is equal to 4 and the length is equal to 8B.

FIG. 11 shows an example of the data structure of the top page 32-0 in FIG. 8. A data structure of each of the remaining 1-page to 15-page is also fundamentally similar to that of the top page in FIG. 11. What is different from the top page is that the subsequent page number storing area 42 shown by "noNext" in the header portion 36 stores the number of pages which can be further traced from the relevant page and the number of pages is smaller than that in the case of the top page. For example, "0" is stored in the subsequent page number storing area 42 in case of the 1-page, 15-page, or the like, "1" is stored in case of the 2-page, 6-page, or the like, "2" is stored in case of the 4-page or 12-page, and further, "3" is stored in case of the 8-page.

Figure 13B:
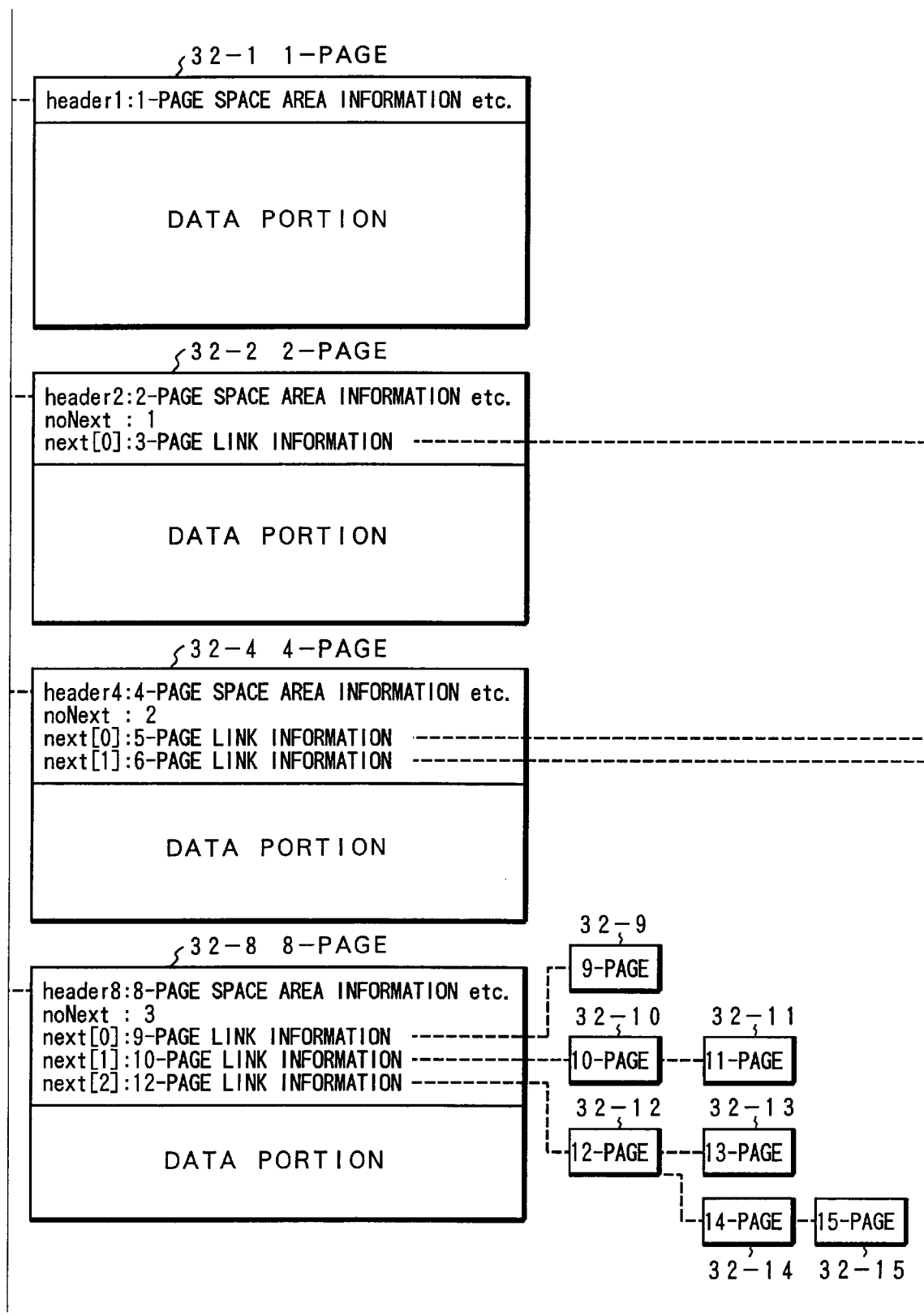

FIGS. 13A, 13B, and 13C show the contents of the data structure of the offset space 30 in FIG. 8 by the link of the routes corresponding to the hypercube 34 in FIG. 10 and specifically show a part of them. That is, the 1-page 32-1, 2-page 32-2, 4-page 32-4, and 8-page 32-8 are arranged in correspondence to the four page link information stored in the 0-page 32-0 in FIG. 11, respectively. In this case, since there is no subsequent page in case of the 1-page 32-1, only the header fixed area of "header1" is provided in the header portion and all the other areas are provided in the data portion. Since the subsequent pages exist with respect to each of the 2-page 32-2, 4-page 32-4, and 8-page 32-8, the numbers of subsequent pages, namely, "1", "2", and "3" are stored in the subsequent page number storing area 42, respectively. Further, the page link information of the number corresponding to the number of subsequent pages is stored by the array next . Further, the next 3-page 32-3 is linked to the 2-page 32-2, the next 5-page 32-5 and the 6-page 32-6 are linked to the 4-page 32-4, and the 6-page 32-6 is further linked to the 7-page 32-7, respectively. The 8-page 32-8 is linked to the next 9-page, 10-page, and 12-page. For convenience of explanation, the data structure of pages shows the pages up to the 8-page 32-8 and the 6-page 32-6. In case of constructing a database by using the offset space, since the costs for input/output are high in the database, it is important to reduce the number of inputting/outputting times. In the invention, a term "distance" is introduced when considering the input/output in the offset space. That is, in the offset space, the number of times of input which is necessary to access to each page is called a distance to each page or a distance of each page.

Figure 14:
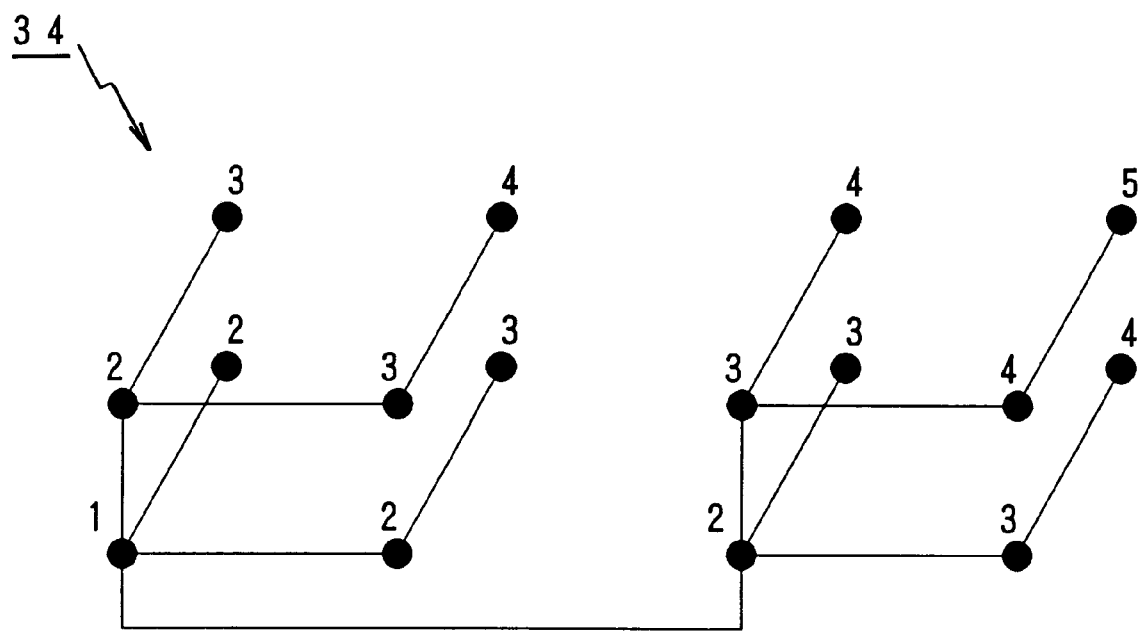
FIG. 14 is an explanatory diagram showing distances of the hypercube in FIG. 10.

In FIG. 14, the distance to each page in the case where the pages in a range from the 0-page to the 15-page have been stored by using the data storing structure of the hypercube 34 in FIG. 10, namely, the number of times of input/output which are necessary to access to each page is shown by a numerical value of 1 to 5 in each node. For example, to access to the 0-page in FIG. 10, since the input of once is necessary, the distance is equal to "1" as shown in FIG. 14. To access to the 1-page in FIG. 10, since the input of twice is necessary in order to first access to the 0-page and subsequently access to the 1-page, the distance is equal to "2" as shown in FIG. 14. Similarly, the distance is equal to "3" as shown in FIG. 14 in case of the 3-page in FIG. 10 and the distance is equal to "5" as shown in FIG. 14 in case of the 15-page in FIG. 10.

The reason why the necessary number of inputting/outputting times is defined by the terminology of "distance of node" is to enable it to be easily and geometrically grasped as an image as will be understood from FIG. 14, although it is substantially the same even if it is expressed by the number of inputting/outputting times.

By using the terminology of this "distance", the average number of inputting/outputting times of the offset space can be obtained as an average distance to each page. In case of the hypercube 34 in FIG. 10, since it has the distances as shown in FIG. 14, the average distance in this case is given by the following equation.

$$(1\times1+2\times4+3\times6+4\times4+5\times1)/16=3$$

Figure 5:
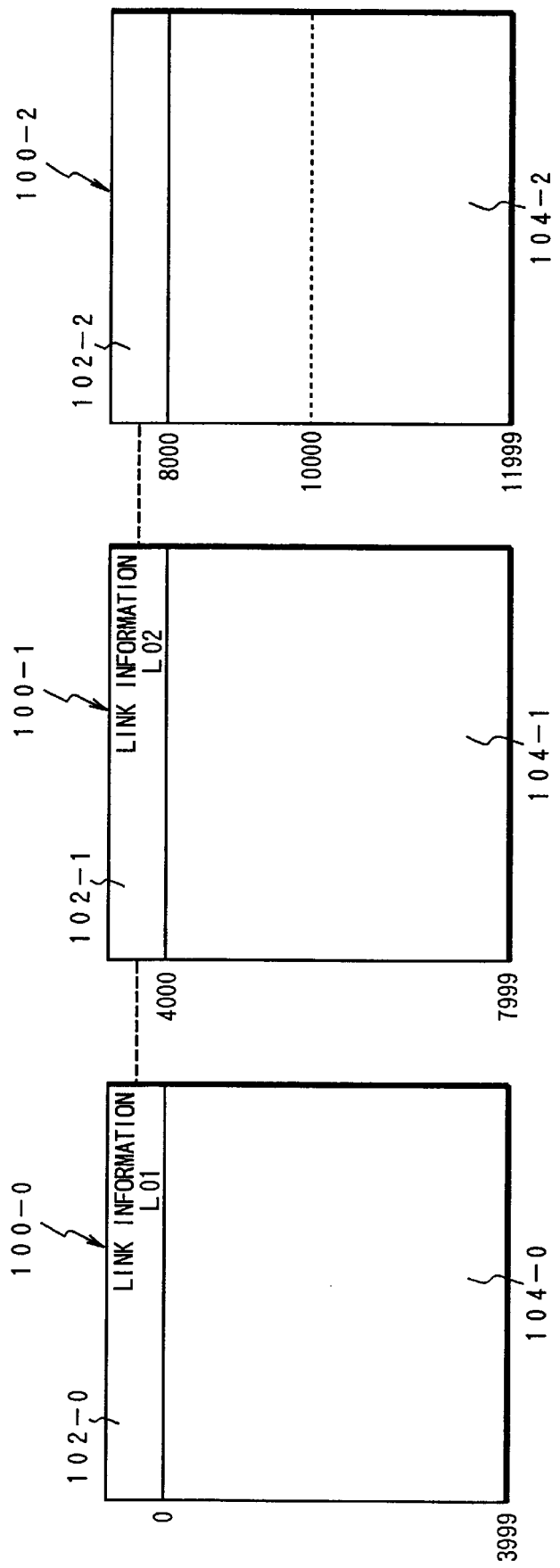
FIG. 5 is an explanatory diagram of an offset space which is realized by a line-shaped link of pages.

On the other hand, the average distance in case of realizing the offset space by linking the pages in a line shape as shown in the conventional structure of FIG. 5 is given by the following equation.

$$(1+2+3+P4+\ldots+16)/16=8.5$$

Figure 6:
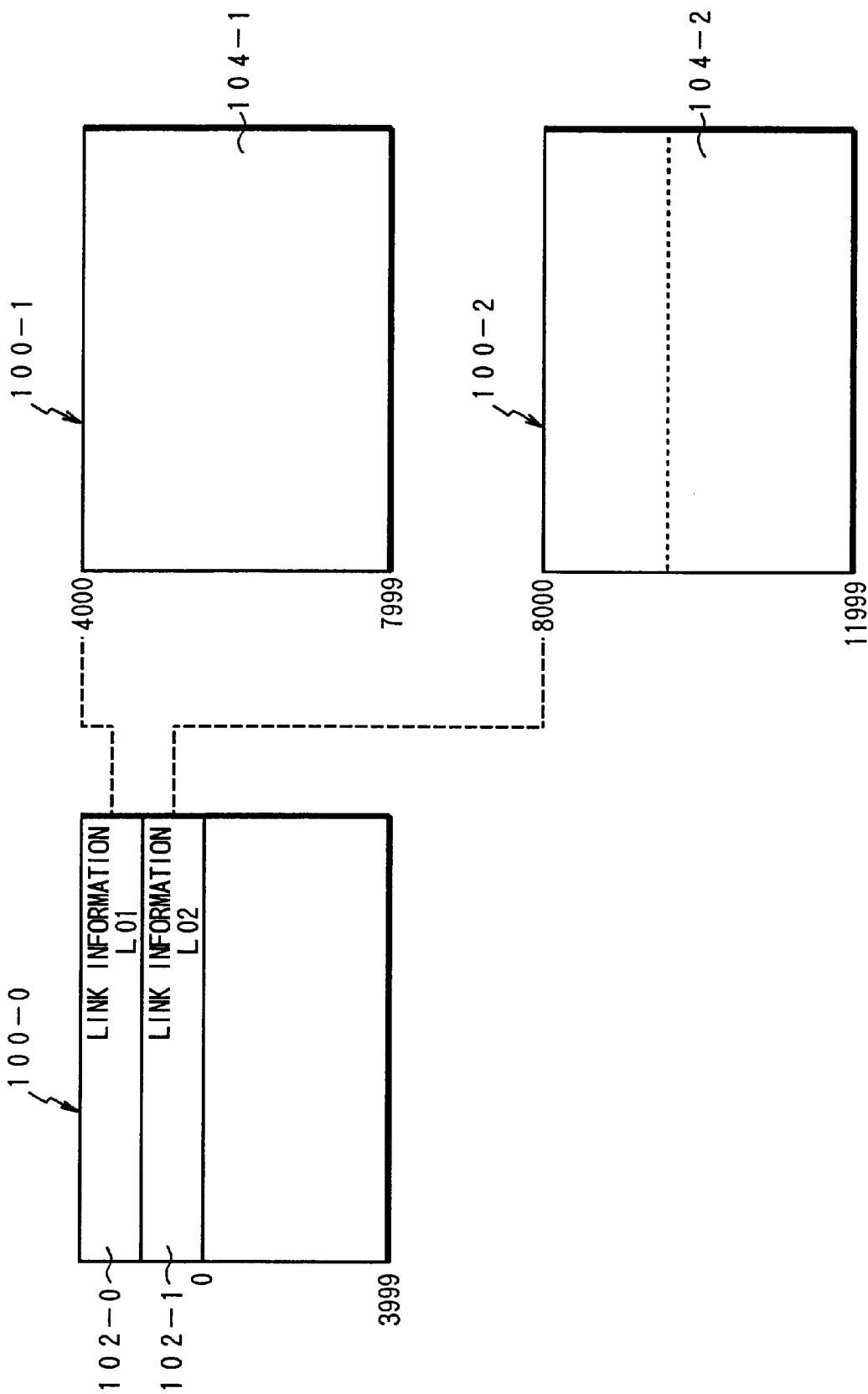
FIG. 6 is an explanatory diagram of an offset space which is realized by a tree-shaped link of pages.

Further, the average distance in case of realizing the offset space by linking the pages in a tree-shape of one stage as shown in the conventional structure of FIG. 6 is given by the following equation.

$$(1\times1+2\times15)/16=1.94$$

In this case, the number of link information which is stored in the top page is equal to 15.

In case of the hypercube of the invention shown in FIG. 14, the maximum number of link information which is provided in the page is equal to 4 in case of the top page. As mentioned above, the average distance of the offset space and the number of link information can be balanced by the hypercube of the invention.

Figure 15:
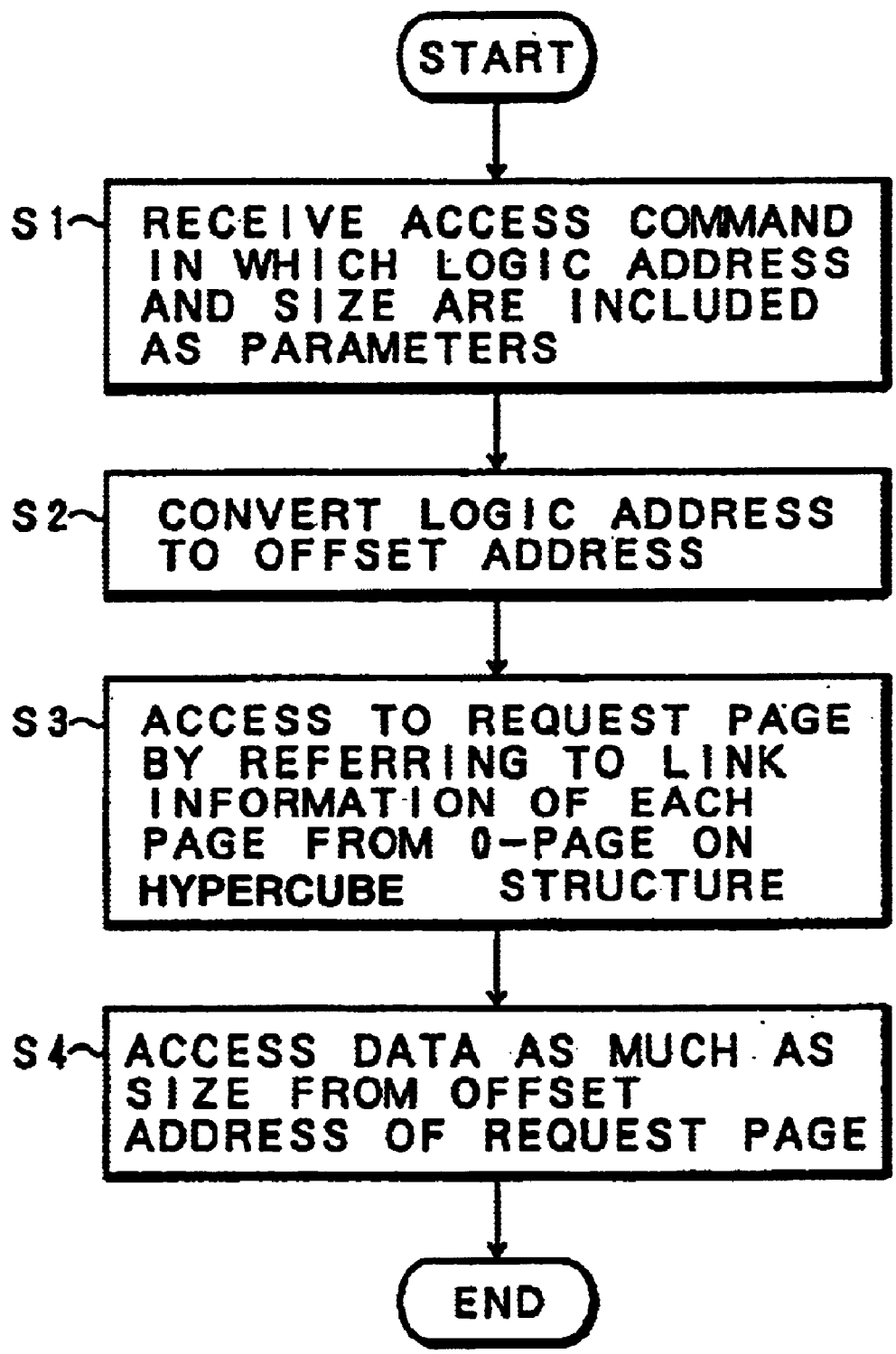
FIG. 15 is a flowchart for an offset space accessing process by a hypercube data structure apparatus in FIG. 8.

FIG. 15 is a flowchart for an accessing process of the offset space using the hypercube data storing structure by the access processing unit 20 provided for the hypercube data structure apparatus 16 in FIG. 8. In step S1, when an access command including the logic address and size as parameters, specifically speaking, a read command or a write command from the CPU 10 is received, the logic address is converted to an offset address in next step S2. As for the conversion to the offset address, since the main storing space 28 for the logic space 26 is known as shown in FIG. 9, the offset serving as an address of the offset space 30 can be obtained by subtracting the size address of the main storing space 28. In step S3, the request page is accessed in order from the 0-page on the hypercube data structure with reference to the page link information provided for the header portion of each page. In step S4, the data as much as the size from the offset address of the request page is finally accessed and the processing routine is finished. In this case, in case of the read access, the data as much as the size from the offset address of the request page is read and transferred to the requesting source. In case of the write access, the data as much as the size from the offset address of the request page is written. Although the details are omitted here, as an obvious embodiment to which the invention can be applied, an embodiment in which one file is realized by one offset space is possible. In this case, a plurality of offset spaces are realized on the secondary storage. An embodiment in which one page of the database system is realized by one offset space is also possible. Also in this case, a plurality of offset spaces are realized on the secondary storage.

(Hypercube Data Storing Structure in Which Three or More Pages are Arranged on One Side)

Figure 16:
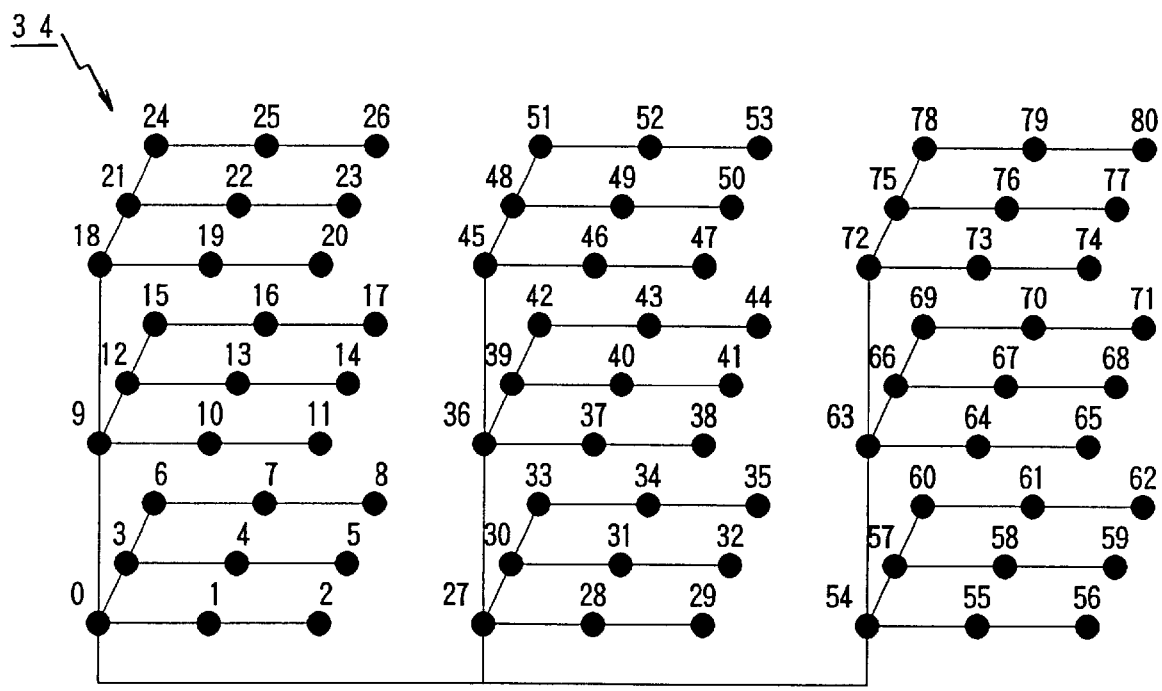
FIG. 16 is an explanatory diagram of a data storing structure of a hypercube of the invention in the case where a dimension (d) is set to 4-dimension and a length (e) of side is set to 3.

FIG. 16 shows another embodiment of a hypercube data storing structure of the invention and this embodiment is characterized in that the hypercube 34 in which two pages can be arranged on one side in FIG. 10 is expanded to thereby enable three or more pages to be arranged on one side of the hypercube 34. That is, although the dimension (d) is equal to 4 in the super cube 34, by designating the number of pages which are arranged on one side to 3, namely, by designating the length (e) of side to 3, the hypercube 34 is constructed. In this case, the maximum number of pages which can be stored in the offset space is equal to 81. By arranging three or more pages onto the side of the hypercube 34 as mentioned above, although the link information which is provided for each page increases, the average distance between the pages can be reduced.

Figure 17:
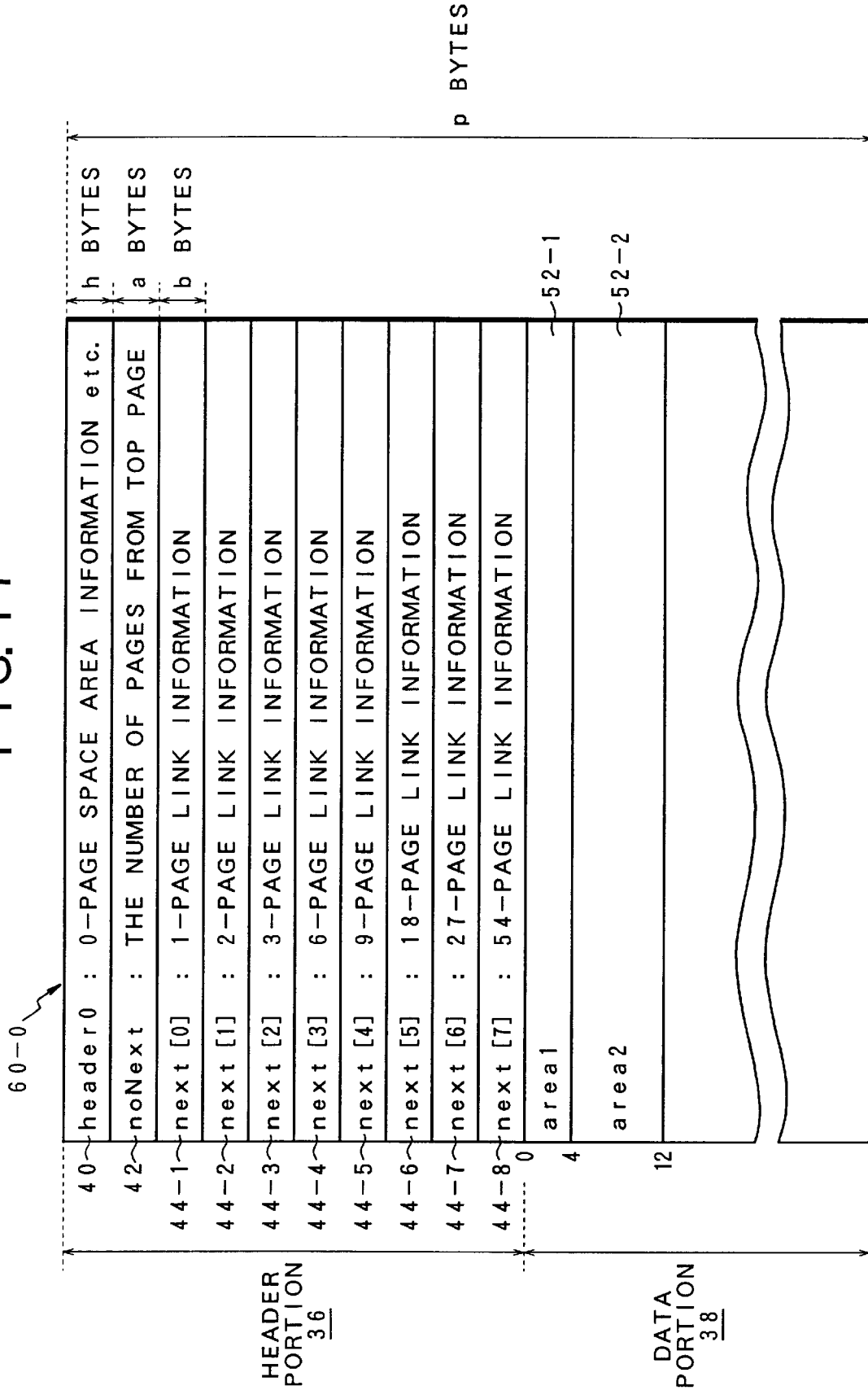
FIG. 17 is an explanatory diagram of a data structure of a 0-page in FIG. 16.

FIG. 17 shows a page data structure to realize a data storing structure of the hypercube 34 in FIG. 16 and relates to an example of a top page 60-0. Also in this case, the data structure of the page is constructed by the header portion 36 and data portion 38. In a manner similar to FIG. 11, the header fixed area 40 shown by "header1" and the subsequent page number storing area 42 shown by "noNext" are provided for the header portion 36. Link information of the next page connected to the 0-page is further stored. In the embodiment, however, since three pages are allocated to one side, eight page information which is twice as large as the four page link information in case of FIG. 11 has been stored. That is, the adjacent pages which can be traced from the 0-page of the super cube 34 in FIG. 16 are eight pages of the 1-page, 2-page, 3-page, 6-page, 9-page, 18-page, 27-page, and 54-page. Among them, (the 1-page and 2-page), (the 3-page and 6-page), (the 9-page and 18-page), and (the 27-page and 54-page) exist on the same side, respectively.

Figure 18:
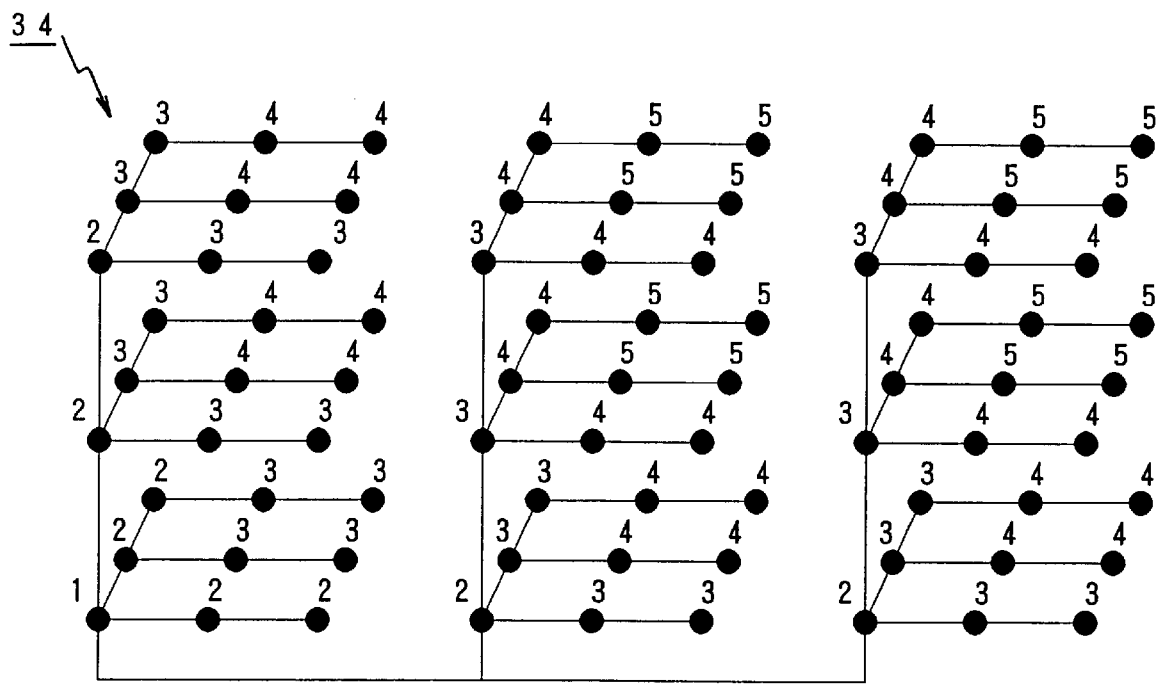
FIG. 18 is an explanatory diagram showing distances of the hypercube in FIG. 16.

FIG. 18 shows the distances corresponding to the number of inputting times to each page in the super cube 34 in the case where three pages are arranged on one side in FIG. 16, and those distances are expressed by numerals 1 to 5, respectively. The average distance to each page is given by the following equation.

(1×1+2×8+3×24+4×32+5×16)/81=3.66 . . .

That is, the average number of inputting times for accessing to each page is equal to about 3.66 times in spite of a fact that there are 81 pages as a whole. The maximum number of link information stored in the page is equal to 8 in case of the top page.

On the other hand, as shown in the conventional example of FIG. 5, the average distance in case of realizing the offset space by linking 81 pages in a line shape is given by the following equation.

(1+2+3+4+. . . +81)/81=41

As shown in FIG. 6, the average distance in case of realizing the offset space by linking 81 pages in a tree-shape of one stage is given by the following equation.

(1×1+2×80)/81=1.99

Although the minimum average distance in case of FIG. 6 is equal to about 1.99 times, the number of link information stored in the top page in this case is equal to 80 and this value is extremely larger than 8 as the number of link information of the top page in the invention.

(Customization by Dimension and Length of Side)

In the hypercube data storing structure of the invention, the adjustment for customization adapted to various conditions by the user which are required in the access of the offset space can be performed. Prior to explaining the customization, the size of offset space showing the number of bytes constructing the offset space will be described. So long as the size of page is fixed, the space size of the offset space using the hypercube data storing structure according to the invention is determined by the designation of the dimension (d) and the length (e) of side of the super cube. Although the size of page can be variable, the size of page is fixed to p bytes here for the purpose of simplicity of explanation. The dimension is now expressed by (d), the length of side is expressed by (e), and the size of offset space in this case is expressed by S(d,e).

A size of header fixed area 40 in the header portion 36 of each page shown in FIGS. 11 and 17 is assumed to be (h) bytes, a size of subsequent page number storing area 42 which is formed in the case where there is a child serving as a subsequent page is assumed to be (a) bytes, and a size of one page link information of the array next{ } which is formed likewise when there is a child is assumed to be (b) bytes. Further, the number of nodes of the dimension (i) is shown by NC(i,d,e) and a size of space of the nodes of the dimension (i) is indicated by a node space NS(i,e). The node space NS(i,e) does not depend on the dimension (d). In case of defining them as mentioned above, a space size S(d,e) of the offset space is given by the following equation.

$$S(d,e) = \mathrm{Sum}\{i=0,d\} NS(i,e) * NC(i,d,e) \ldots \quad (1)$$

where, S(d,e): size of offset space p: page size d: dimension e: length of side h: the number of bytes of the header fixed area a: the number of bytes noNext b: the number of bytes of the array next Now, assuming that the function of Sum{i=0,d} is set to f(i), Sum{i=0,d} in the equation (1) shows Sum{i=0,d}f(i)= f(0)+f(1)+ . . . +f(n) The number NC(i,d,e) of nodes of the dimension (i) of the hypercube constructing the offset space having the pace size S(d,e) is given by the following equation.

$$NC(i, d, e) = \begin{cases} 1, & \text{in case of } i = d \\ (e-1)^* e^{\wedge}(d-i-1), & \text{in case of } 0 \leq i \leq d \end{cases} \quad (2)$$

e^(d−i−1) at the second stage on the right side in the equation (2) denotes the (d−i−1) power of (e). Further, the node space NS(i,e) of the dimension (i) is given by the following equation.

$$NS(i, e) = \begin{cases} p - h, & \text{in case of } i = 0 \\ p - h - a - b^* i^*(e-1), & \text{in case of } 0 < i < d \end{cases} \quad (3)$$

In the invention, the user can designate the dimension (d) and the length (e) of side with respect to the hypercube and the user can perform the following customization by designating those values.

I. In the case where an amount of data to be stored is large, the dimension (d) or the length (e) of side is increased.
II. In the case where an amount of data to be stored is relatively small,
the user data is inserted as much as possible, thereby reducing the management information. It can be realized by reducing the dimension (d) or the length (e) of side for this purpose.
III. In case of balancing the average distance and the management information,
intermediate values between the above two values are designated as a dimension (d) and a length (e) of side.
IV. In case of shortening the average distance, it can be realized by increasing the number (e) of sides. In this case, however, an amount of user data which is inserted in the same page is pressed by the link information and reduced.

The case of shortening the average distance of (4) in the customization will be described in detail as follows. The most extreme construction in case of shortening the average distance of the nodes, namely, in case of accessing at a high speed by reducing the number of inputting times is to fill the whole area in the top page with the management information. That is, if the symbols shown in the equation (1) to obtain the space size S(d,e) of the offset space are used, the length (e) of side in case of filling the top page with the management information is expressed by the following equation.

$$e = \mathrm{floor}((p-h-a)/b*d+1) \ldots \quad (4)$$

where, floor ( ): the maximum integer which is equal to or smaller than the value shown in ( )

It is now assumed that a size (p) of page is equal to 4 kB (=4096 bytes), a length (h) of fixed area 40 of the header portion 36 is equal to 96 bytes, a size (a) of subsequent page number storing area 42 which is formed in the case where there is a child having subsequent pages is equal to 4 bytes, and a size (b) of one element of the link information 44-i which is formed likewise in the case where there is a child is set to 12 bytes. In this case, relations among the dimension (d), length (e) of side, and the size of offset space which can be realized at that time, namely, the space size S(d,e) are as shown in a table of FIG. 19. In this table, the size of offset space, namely, the space size S(d,e) is calculated by using the equation (1). The calculated length (e) of side is very large. In this case, a size of offset space is determined by the total size of spaces of the nodes of almost 0-dimension. That is, the space size S(d,e) is calculated by the following equation.

$$S(d,e) \sim NS(0,d,e)*NC(0,d,e) = (e-1)*e^{\hat{}}(d-1)*(p-h) \ldots \quad (5)$$

In this equation (5), "~" denotes "almost equal". FIG. 19 shows an approximate result of the offset space calculated by the equation (5). However, the size of actual offset space is slightly larger than the value shown in the table of FIG. 14. As will be obviously understood from the result of FIG. 19, a very large offset space can be constructed by the relatively small number of stages, namely, dimension (d).

(Expansion of Offset Space and Realization of Continuous Area)

In the hypercube 34 to realize the data storing structures of the invention shown in FIGS. 10 and 16, the maximum number of pages of the offset space is determined by the number of nodes of the hypercube designated by the dimension (d) and the length (e) of side. In the case where the number of used pages reaches the maximum number of pages and the offset space becomes full, the present invention has an expanding function of the offset space by further enlarging the data storing structure of the hypercube.

As a method of expanding the offset space,
recursive expanding method
expanding method by reconstruction
or the like is used.

FIG. 20 shows an expansion of the offset space by the recursive method. When the offset space which is determined by the hypercube 34 becomes full, for example, although the 15-page generally does not have a link, a structure of the 15-page is set to be identical to that of the 0-page for the purpose of expansion. That is, a hypercube 62 having the same structure as that of the pages in a range from the 15-page to the 0-page is added, thereby enabling the pages in a range from the 16-page to the 31-page to be expanded. Further, in the expanded hypercube 62, when the offset space up to the 31-page becomes full, the hypercube from the 0-page is expanded in a manner similar to the case of the pages in a range from the 31-page to the 0-page, thereby enabling the pages in a range from the 32-page to the 47-page to be expanded. As mentioned above, the hypercube of the invention can be fundamentally expanded to an arbitrary size so long as the areas of the secondary storage of the disk unit or the like permit.

The expanding method by the reconstruction will now be described. The expanding method by the reconstruction is a method whereby when the offset space by the hypercube constructed by the dimension(d) and the length (e) of side which were initially designated becomes full, for example, the dimension (d) is increased. However, in case of increasing the dimension (d), the management information in the page needs to be increased. The information of the offset space when it becomes full is copied into another area and, thereafter, the dimension (d) is increased and management information of each page needs to be formed again.

In the hypercube data storing structure of the invention, an embodiment to realize the continuous area without depending on the size of page will now be described. To realize the continuous area, it is sufficient to realize the page of a larger size. As a method of setting the larger size of page, there are the following methods.

I. Pages of 8 kB, 12 kB, 16 kB, . . . as pages corresponding to a multiple of the minimum page, for example, the minimum page of 4 kB are used.
II. Pages of sizes obtained by sequentially doubling the minimum page, for example, the minimum page of 4 kB, namely, pages of, for instance, 4 kB, 8 kB, 16 kB, . . . obtained by multiplying the minimum page by a multiple of the power of 2 are used.

In case of realizing the pages of such sizes, a pointer indicative of a page start position has to be displayed in a manner such that the pages can be seen as a continuous area. For this purpose, on the system side, it is necessary to prepare a continuous buffer to arrange the pages of those sizes. However, the pages of those sizes do not always need to be continuous on the secondary storage. For example, all pages are divided into the pages of the size of 4 kB on the secondary storage and, in this case, it is sufficient to allow the areas to be seen as a continuous area of, for example, 8 kB, 12 kB, 16 kB, . . . by copying them into the buffer prepared by the system.

A realizing method of the page management area for managing a storing state of the data in the data portion in each page shown in FIGS. 11 and 17 will now be described. As page area management information showing the storing state of the data in the data portion 38 in the page, the management information is stored in the fixed storing area 40 of the header portion 36. As a first method of the page area management to manage the data storing state in the page, it is sufficient to use a method similar to that of the area management of the main storage. That is, a list showing correspondence relations between, for example, the data areas 52-1 and 52-2 stored in the data portion 38 in the page and the addresses is formed, each area is managed in accordance with this list, and in the case where the area is opened, the re-use of this area is enabled. As a second realizing method of the page area management to manage a state of the data storing area in the page, there is a method by heaps. The method by heaps is simpler than the area management of the main storage.

First, a continuous area called a heap is assured in the data portion 38. A pointer is first provided and shown at the head position of the heap areas. When areas are requested by an access, the pointer is advanced by a distance corresponding to the request areas through the areas as long as the length requested via the pointer. However, according to the method by heaps, even if the used areas are opened in the midway, since the opening cannot be known, they cannot be used again.

According to the invention as described above, the following effects are obtained.

First, since the structure of the hypercube is used as a data storing structure, the offset space of high access efficiency can be realized. Specifically speaking, the conventional data, complicated data, and long data can be efficiently accessed and stored. It is possible to properly cope with a variety of requests for the offset space. For example, the length of side indicative of the number of inputting times to the page of the hypercube can be set to 3 or more and the balance between the management information and the user information can be customized by the two parameters of the length of side and the dimension. It is possible to properly cope with the requests for various offset spaces.

As specific requests, in case of a large data amount or in the case where there is a possibility that the data amount increases, and further, in case of long data, by collecting the management information to the top page, the requirement for raising the whole average access efficiency can be satisfied. In case of a small data amount, by reducing the management information of the top page and preventing the portion of the user data from being pressed by the management information of the top page as possible, the number of accessing times is concentrated to the top page, thereby enabling the efficiency to be raised.

Further, with respect to the intermediate case between them, the management information and the user data can be allowed to coexist in a well-balanced state. In the invention, in the offset space having the data storing structure of the hypercube which is determined by the dimension and the length of side which have previously been designated, the space can be expanded on a page unit basis by a necessary amount. Further, when the offset space becomes full, the offset space can be expanded to a space larger than the initially designated offset space by the reconstruction due to the addition of the expanding space having the data structure of a new hypercube or the increase in dimension. Further, the continuous area is provided in the space by changing the page size on the offset space without copying into the area on the system prepared by the user and the data in the continuous area can be provided without compelling the user to performing the copying operation.

The invention is not limited to the foregoing embodiment but incorporates many proper modifications without departing from the objects and advantages of the invention. The invention is not limited by the numerical values shown in the embodiment.

What is claimed is:

1. A computer controlling storage of page data according to a data structure for storing data in a hypercube, comprising:

a hypercube constructing unit realizing an offset space of a secondary storage as a data storing structure of a hypercube; and an access processing unit accessing a requested page in the offset space by using the data storing structure of said hypercube, wherein said hypercube constructing unit defines the hypercube by a dimension, nodes, and sides, allocates each of top to last pages divisionally constructing said offset space to the nodes of said hypercube, and sets a side linking pages from a node of a top page to a node of a subsequent page, and on the basis of a requested offset, said access processing unit accesses the requested page in accordance with a route determined by the dimension, the nodes, and the sides of said hypercube.

2. An apparatus according to claim 1, wherein said hypercube constructing unit constructs each of said pages by a header portion and a data portion and stores link information of the subsequent pages allocated to the nodes of said hypercube into said header portion, and said access processing unit sequentially accesses from the top page to the requested page with reference to the link information of each page.

3. An apparatus according to claim 2, wherein said hypercube constructing unit sets a page identifier of a link destination, an obtainable maximum area size of an area among the subsequent pages, and a final offset of a subsequent partial hypercube as link information of said header portion, and when the requested offset is included in its own page area, said access processing unit finishes a route search of the hypercube structure and accesses the data in the relevant area, and when the requested offset is not included in its own page area, said access processing unit accesses to the page of a subsequent route including the requested offset.

4. An apparatus according to claim 1, wherein said hypercube constructing unit defines the number of pages which are allocated onto a side, including the nodes of said hypercube as a side length, sets said side length to 2 or more, and sets the number of pages existing on one side to 2 or more.

5. An apparatus according to claim 1, wherein in the case where the offset space in which the pages have been allocated onto said hypercube which has previously been constructed becomes full, said hypercube constructing unit links a new hypercube and expands the offset space.

6. An apparatus according to claim 1, wherein sizes of pages which are allocated to said hypercube are made different.

7. An apparatus according to claim 1, wherein sizes of pages which are allocated to said hypercube are set to a minimum size and a multiple of the minimum size or a multiple of the power of said minimum size.

8. An apparatus according to claim 1, wherein said hypercube constructing unit adjusts a dimension (d) of said hypercube and a length (e) of side which is defined by the number of pages which are allocated onto a side including the nodes, thereby meeting various requests.

9. A computer readable storage storing page data according to a data structure for storing data in a hypercube comprising:

an offset space constructed to store pages according to a data storing structure of a hypercube having a dimension, nodes, and sides, each of top to last pages divisionally constructing said offset space are allocated to the nodes of said hypercube, a side of the hypercube is set for linking pages from a node of a top page to a node of a subsequent page, wherein a requested page in the offset space is accessible by a computer based upon an offset request according to a route determined by the dimension, the nodes and the sides of the hypercube data storing structure.

10. The storage according to claim 9, wherein each page comprises a header portion and a data portion and the header portion stores link information of the subsequent page allocated to the node of said hypercube, wherein the requested page in the offset space is accessible by the computer based upon sequentially accessing from a top page to the requested page included in the offset request with reference to the link information of each page.

11. The storage according to claim 10, wherein the link information comprises a page identifier of a link destination, an obtainable maximum area size of an area among the subsequent pages, and a final offset of a subsequent partial hypercube, wherein the requested page in the offset space is accessible by the computer by finishing a route search of the hypercube data storing structure when the requested page is included in its own page area, and searching a subsequent route in the subsequent partial hypercube according to the link information when the requested page is not included in its own page area.

12. The storage according to claim 9, wherein a number of the pages allocated onto the side including the nodes of said hypercube are defined as a length of the side, said length of the side is set to 2 or more, and the number of the pages existing on one side is set to 2 or more.

13. The storage according to claim 9, wherein if the offset space in which the pages have been allocated onto said hypercube which has previously been constructed becomes full, the offset space is expanded according to a new hypercube linked to the previous hypercube.

14. The storage according to claim 9, wherein sizes of the pages allocated to said hypercube are different from each other.

15. The storage according to claim 9, wherein sizes of the pages allocated to said hypercube are set to a minimum size and a multiple of the minimum size or a multiple of a power of said minimum size.

16. The storage according to claim 9, wherein the offset space is adjusted to meet various offset requests according to adjusting a dimension (d) of said hypercube and a length (e) of a side defined by a number of the pages allocated onto the side including the nodes.

17. A method of storing page data in a computer according to a data structure for storing data in a hypercube, comprising:

realizing an offset space of a secondary storage as a data storing structure of a hypercube; and accessing a requested page area in the offset space by using the data storing structure of the hypercube, wherein said realizing comprising defining the hypercube by dimension, nodes and sides, allocates each of a top to last pages divisionally constructing the offset space to the nodes of the hypercube and sets a side for linking pages from a node of a top page to a node of a subsequent page, and wherein said accessing comprises accessing the requested page in accordance with a route determined by the dimension, the nodes and the sides of the hypercube on the basis of a requested offset.

18. A method according to claim 17, wherein said realizing comprising defining the number of pages which are allocated onto a side, including the nodes of the hypercube as a side length, setting the side length to two or more, and setting the number of pages existing on one side to two or more.

19. The method according to claim 17, wherein said realizing comprises linking a new hypercube and expanding the offset space when the offset space in which the pages have been allocated onto the hypercube which had previously been constructed, becomes full.

20. A method according to claim 17, wherein sizes of pages which are allocated to the hypercube are made different.

21. A method according to claim 17, further comprising setting sizes of pages which were allocated to the hypercube to a minimum size and a multiple of a minimum size or a multiple of the power of the minimum size.

22. A method according to claim 17, wherein said realizing comprises adjusting a dimension of the hypercube and a length of side which is defined by the number of pages which are allocated onto a side including the nodes.

* * * * *